(12) United States Patent
Aiso

(10) Patent No.: US 7,409,106 B2
(45) Date of Patent: Aug. 5, 2008

(54) IMAGE GENERATING DEVICE, IMAGE GENERATING METHOD, AND IMAGE GENERATING PROGRAM

(75) Inventor: Seiji Aiso, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 750 days.

(21) Appl. No.: 10/764,004

(22) Filed: Jan. 22, 2004

(65) Prior Publication Data

US 2004/0218828 A1      Nov. 4, 2004

(30) Foreign Application Priority Data

Jan. 23, 2003    (JP) .............................. 2003-015171

(51) Int. Cl.
    G06K 9/36    (2006.01)
    G06K 9/32    (2006.01)
    G06K 9/40    (2006.01)
(52) U.S. Cl. ........................ 382/284; 382/254; 382/294; 382/295; 382/296; 382/299
(58) Field of Classification Search .................. 382/254, 382/295, 296, 299, 284, 294
See application file for complete search history.

(56) References Cited

U.S. PATENT DOCUMENTS

| 5,987,164 A * | 11/1999 | Szeliski et al. ............... 382/154 |
| 6,687,419 B1 * | 2/2004 | Atkin .......................... 382/284 |
| 6,784,891 B2 * | 8/2004 | Inuzuka et al. .............. 345/555 |
| 6,804,419 B1 * | 10/2004 | Miyake ....................... 382/300 |
| 2007/0263113 A1 * | 11/2007 | Baek et al. .................. 348/340 |

FOREIGN PATENT DOCUMENTS

| EP | 1008956 A1 * | 6/2000 |
| JP | 10-262182 | 9/1998 |
| JP | 11-164264 | 6/1999 |
| JP | 2000244851 A * | 9/2000 |
| JP | 2001-045359 | 2/2001 |
| JP | 2002-271683 | 9/2002 |

OTHER PUBLICATIONS

Abstract of Japanese Patent Publication No. 11-164264 Pub. Date: Jun. 18, 1999, Patent Abstracts of Japan.
Abstract of Japanese Patent Publication No. 10-262182, Pub. Date: Sep. 29, 1998, Patent Abstracts of Japan.
Abstract of Japanese Patent Publication No. 2001-045359, Pub Date: Feb. 16, 2001, Patent Abstracts of Japan.
Abstract of Japanese Patent Publication No. 2002-271683, Pub Date: Sep. 20, 2002, Patent Abstracts of Japan.

* cited by examiner

*Primary Examiner*—Jingge Wu
*Assistant Examiner*—Bernard Krasnic
(74) *Attorney, Agent, or Firm*—Martine Penilla & Gencarella, LLP

(57) ABSTRACT

Designed to determine a number of frames of data for acquisition from video data on the basis of image quality setting data that allows image quality to be set for an image output by an image output device; and to acquire from the video data the determined number of frames of data, and synthesize the acquired number of frames of data to generate image data representing tones of an image by means of a multitude of pixels. Since image data can be generated by synthesizing frames of data in a number appropriate to the image quality of the output image, the process of generating image data representing a still image can be performed efficiently, and a still image derived efficiently.

2 Claims, 27 Drawing Sheets

Fig.5
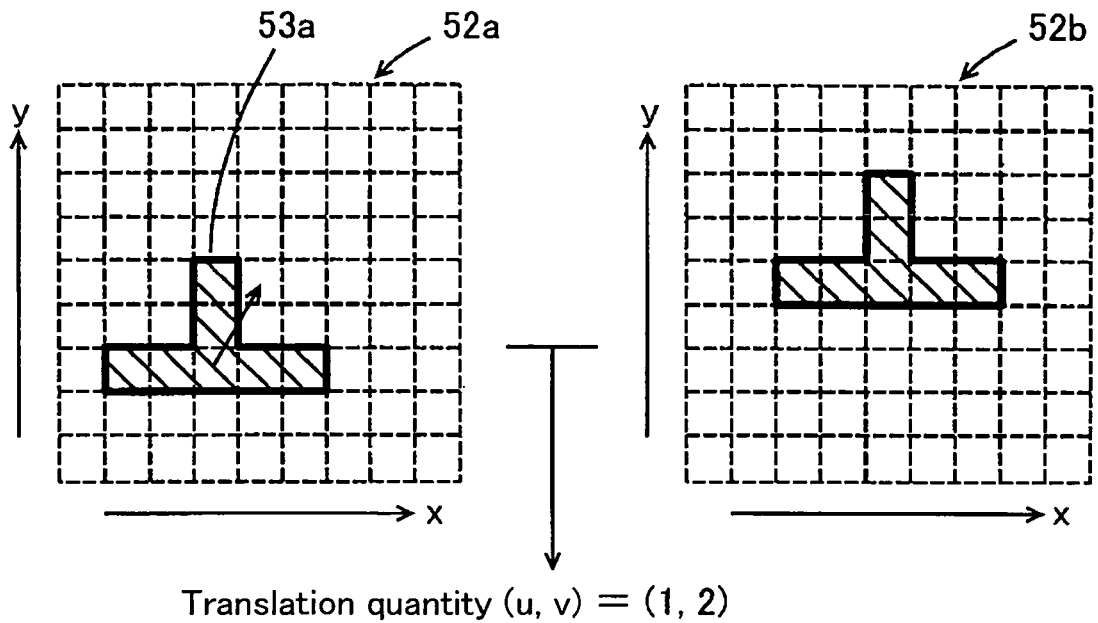
Translation quantity (u, v) = (1, 2)
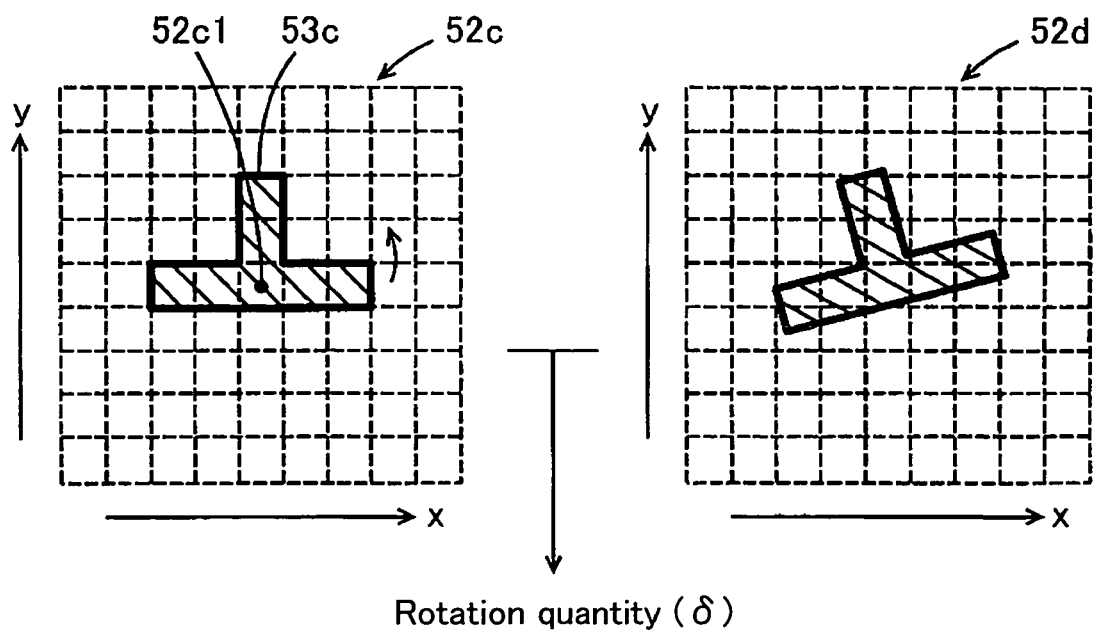
Rotation quantity (δ)

Fig.6

Image quality setting data

Faster ⇐⟶ Higher image quality

Example 1 →

| Image quality mode setting | 1 | 2 | 3 | 4 | 5 |
|---|---|---|---|---|---|
| Image quality improvement V | 1 | 2 | 3 | 4 | 5 |

$$V: \text{Coefficient of } \frac{\text{Total number of pixels of frame data}}{\text{Total number of pixels of generated image data}}$$

Example 2 →

| Image quality mode setting | 1 | 2 | 3 | 4 | 5 |
|---|---|---|---|---|---|
| Threshold value TH1 | 0.8 | 0.6 | 0.4 | 0.3 | 0.2 |

TH1: Threshold value for average distance to closest pixel among pixels in plurality of frames of data Example 3 →

| Image quality mode setting | 1 | 2 | 3 | 4 | 5 |
|---|---|---|---|---|---|
| Threshold value TH2 | 1.5 | 2 | 2.5 | 3.5 | 4.5 |

TH2: Threshold value for average number of frames of data having pixel in predetermined range Example 4 →

| Image quality mode setting | 1 | 2 | 3 | 4 | 5 |
|---|---|---|---|---|---|
| Threshold value TH3 | 0.6 | 0.3 | 0.2 | 0.1 | 0.05 |

$$TH3: \frac{\text{Number of pixels wherein number of pixels in predetermined range} = 0}{\text{Total number of pixels of generated image data}}$$

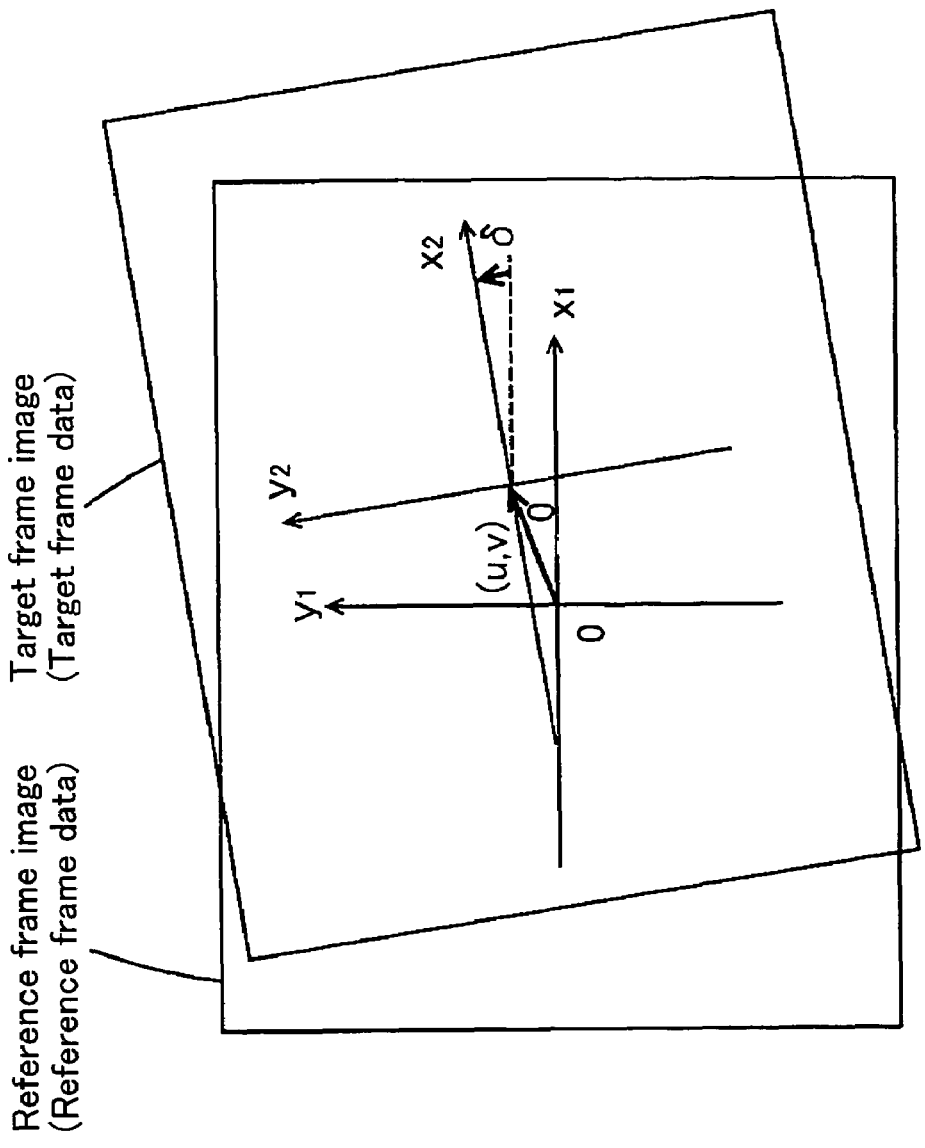

Fig.8
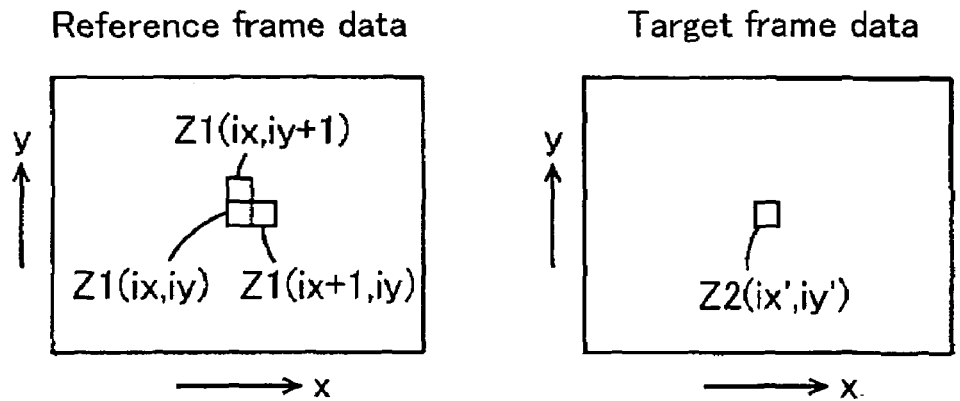
Reference frame data  Target frame data
⇓ Gradient method
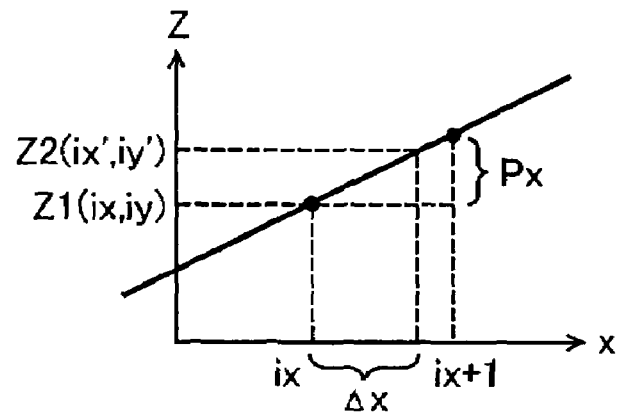
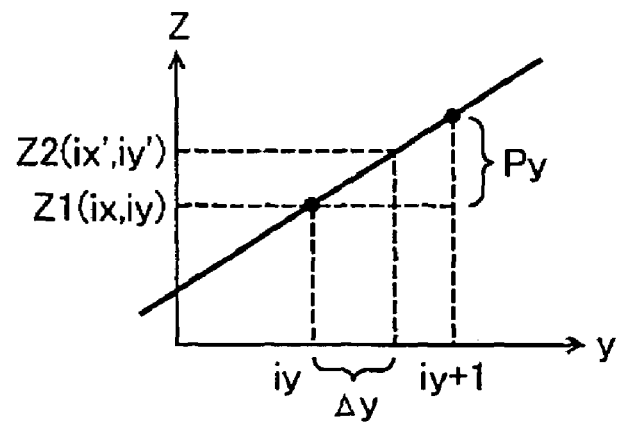

- ● Pixel of generated image
- ◇ Pixel of Frame 1
- ◈ Pixel of Frame 2
- ⇔ Pixel of Frame 3
- ✦ Pixel of Frame 4

- ● Pixel of generated image
- ◇ Pixel of Frame 1
- ◈ Pixel of Frame 2
- ⬙ Pixel of Frame 3
- ◈ Pixel of Frame 4
- ◈ Pixel of Frame 5

IMAGE GENERATING DEVICE, IMAGE GENERATING METHOD, AND IMAGE GENERATING PROGRAM

CROSS-REFERENCE TO RELATED APPLICATION

This application claims priority under 35 U.S.C. § 119 based on Japanese Application No. 2003-015171, filed on Jan. 23, 2003.

BACKGROUND OF THE INVENTION

1. Field of the Invention

The present invention relates to a technique of generating image data from information consisting of multiple frames.

2. Description of the Related Art

Generation of image data representing a still image from video data representing video shot with a digital video camera or the like, and printing out of still images based on such image data, is known in the prior art. Video data is composed of data for a plurality of frames representing images by means of tone data for a multitude of pixels, on a pixel by pixel basis; image data that represents a still image by means of tone representation with a multitude of pixels is created by acquiring and synthesizing data for a predetermined number of frames selected from the video data.

Since video shot with a digital video camera is often shaky due to camera shake, vertical and horizontal deviation among images represented by multiple frames of data is detected in pixel units, superimposing the image over a standard image, and translating it (i.e. subjecting to parallel movement) by Nx pixels in the horizontal direction and Ny pixels in the vertical direction (where Nx and Ny are positive integers) in order to minimize vertical and horizontal deviation.

Japanese Patent Laid-Open No. H11-164264 teaches a process for resolution conversion from a standard resolution image into a high resolution image, by providing high-resolution image memory, detecting motion of the image, and infilling the pixels of the high resolution image a plurality of standard resolution image pixels translated according to motion of the image. As disclosed in section 0089 of this cited publication, the process of infilling each pixel of the image is repeated until a determination is made that a scene change has occurred, or that input of distorted images (standard resolution images) has been completed.

The prior art has drawbacks such as the following.

The former technique has the drawback of requiring extended processing time, due to generation of more image data than is necessary for the required image quality, resulting from the fixed number of frames of data synthesized.

The latter technique has the drawback also has the drawback of requiring extended processing time, since frame information continues to be synthesized until determination is made that a scene change has occurred or that input of frame information has been completed, thus also generating more image data than necessary for the required image quality.

SUMMARY OF THE INVENTION

With the foregoing in view, it is an object of the present invention provide a technique capable of efficiently executing a process for generating image data that represents a still image, in order to efficiently produce a still image.

To achieve the stated object, according to the present invention, the step (a) initially determines, on the basis of image quality setting data that allows image quality to be set for an image output by an image output device, a number frames of data to be acquired from video data having a multitude of frames of data. The data of each frame takes the form of data for tone representation of an image with a multitude of pixels. Data of the determined number of frames is then acquired from the video data. Thereupon, the step (b) synthesizes the data of the number of frames selected in the step (a), to generate image data.

That is, since it is possible to generate image data by synthesizing data of a number of frames suitable for the image quality desired of the output image, it becomes possible to efficiently execute the process of generating image data representing the still image, so as to efficiently produce the still image. For example, where high image quality is desired in the output image, the image data may be synthesized from data for a relatively large number of frames, whereas when it is desired to print the output image quickly, the image data may be synthesized from data for a relatively small number of frames. This allows still images of target image quality to be obtained with minimal processing time.

The aforementioned image output device could conceivably be any of a number of various devices, such as a printer for inputting and printing out image data, or a display for display output.

Conceivable formats for the image quality setting data include various formats such as numerical information or text information, for example.

Here, there may be additionally provided the steps of (c) acquiring, on the basis of the plurality of frames of data, deviation data representing deviation among images represented by the plurality of frames of data; and (d) performing a conversion process wherein, on the basis of the acquired deviation data, at least one of the respective images represented by the plurality of frames of data is moved to convert at least one of the plurality of frames of data in order to reduce deviation among images. The step (b) may be designed to synthesize the plurality of frames of data subjected to the conversion process, to generate the image data.

That is, since image data representing tones of an image is generated by being synthesized from the plurality of frames of data, and deviation among the plurality of images represented by the plurality of frames of data has been reduced, camera shake can be corrected. Accordingly, still images of high image quality can be obtained from data of multiple frames selected from video data.

Frame data and image data may conceivably be information of various data formats such as bitmap data, compressed data, or the like, for example. Frame data and image data may be composed of various kinds of data, for example, YbCbCr data consisting of luminance data (Y) and color difference data (Cb, Cr); RGB data consisting of red data (R), green data (G), and blue data (B); CMYeG data consisting of cyan data (C), magenta data (M), yellow data (Ye), and green data (G), Lab data in the CIE Lab color space, or the like.

The step (c) may, on the basis of the plurality of frames of data, acquire rotation data representing rotational deviation among images represented by the plurality of frames of data; and the step (d) may perform a conversion process wherein, on the basis of the acquired rotation data, at least one of the respective images represented by the plurality of frames of data is rotated to convert at least one of the plurality of frames of data so that rotational deviation among images is reduced.

Alternatively, the step (c) may, on the basis of the plurality of frames of data, acquire translation data representing translational deviation among images represented by the plurality of frames of data; and the step (d) may perform a conversion process wherein, on the basis of the acquired translation data, at least one of the respective images represented by the plurality of frames of data is translated to convert at least one of the plurality of frames of data so that translational deviation among images is reduced.

That is, frame data is synthesized so as to reduce rotational deviation and translational deviation (horizontal/vertical deviation) among frame data, and a still image is generated. By also reducing translational deviation at a predetermined center location about which the image is rotated, the slope component of camera shake may be corrected more properly. Accordingly, still images of higher image quality can be obtained.

The aforementioned rotation data and translation data may conceivably consist of information of various kinds, such as such as numerical information or text information, for example.

As a specific example of the aforementioned conversion process, the step (d) may perform a conversion process wherein on the basis of the rotation data and the translation data, locations of pixels of at least one of the plurality of frames of data are converted so as to reduce deviation between both the images. During this process, the step (d) may convert locations of pixels of at least one of the plurality of frames of data, using units smaller than the pixels. Since location conversion (coordinate conversion) of each pixel of frame information can be carried out with a high degree of accuracy, still images of higher image quality can be obtained.

The step (a) may be designed such that the number of the frames acquired increases in association with higher image quality indicated by the image quality setting data. The higher the image quality signified by image quality setting data, the greater the number of frames synthesized, making it possible to obtain a still image of higher image quality. On the other hand, the lower the image quality signified by image quality setting data, the smaller the number of frames synthesized, making it the process of generating image data faster. Accordingly, the process of generating image data representing a still image can be carried out efficiently, to generate the still image.

The step (a) may be designed to determine the number of the frames of data for acquisition on the basis of the total number of pixels in the frame data and the image quality setting data, and to acquire the determined number of the frames of data from the video data. By means of the simple arrangement of determining, on the basis of the number of pixels, the number of frames of data to be synthesized, the process for generating image data can be carried out efficiently.

In the present invention, image quality of a still image is higher the greater the number of pixels in the synthesized frame information, thereby making it possible to more reliably generate image data by synthesizing a number of frames of data appropriate for the image quality desired of the output image, so that it becomes possible to efficiently carry out the process of generating image data, in a more reliable manner.

The step (a) may also be designed to, in the course of sequential acquisition of the frames of data from the video data, calculate for each pixel in the image data the distance to the closest pixel among the pixels in the plurality of acquired frames of data; and on the basis of a summary value of the calculated distances and the image quality setting data, to determine whether a predetermined terminating condition for terminating acquisition of the frame data is met, and in the event that the terminating condition is met, to terminate acquisition of the frame data. Since image quality of a still image is higher the closer pixels in frame data are to the pixels in the image data being generated, it is possible to more reliably generate image data by synthesizing a number of frames of data appropriate to the image quality desired of the output image, so that it becomes possible to efficiently carry out the process of generating image data.

Possible summary values for calculated distance could include, for example, arithmetic mean, geometric mean, harmonic mean (inverse of the arithmetic mean of the inverse of calculated distance), an average with different weight for each calculated distance, sum, or the like. The same may be said where a plurality of numbers are summarized. In the present invention, the process of generating image data reliably by means of a simple arrangement may be carried out efficiently.

Alternatively, the step (a) may be designed to, in the course of sequential acquisition of the frames of data from the video data, calculate the number of frames of data having pixels within a predetermined range for each pixel in the image data; and on the basis of a summary value of the calculated number and the image quality setting data, to determine whether a predetermined terminating condition for terminating acquisition of the frame data is met, and in the event that the terminating condition is met, to terminate acquisition of the frame data.

Since image quality of a still image is higher the closer pixels in frame data are to the pixels in the image data being generated, it possible to more reliably generate image data by synthesizing a number of frames of data appropriate to the image quality desired of the output image, so that it becomes possible to efficiently carry out the process of generating image data. In the present invention, the process of generating image data reliably by means of a simple arrangement may be carried out efficiently.

Alternatively, the step (a) may be designed to, in the course of sequential acquisition of the frames of data from the video data, calculate among the pixels in the frame data the number of pixels of frame data within a predetermined range whose number of pixels is equal to or less than a predetermined number; and on the basis of a summary value of the calculated number and the image quality setting data, to determine whether a predetermined terminating condition for terminating acquisition of the frame data is met, and in the event that the terminating condition is met, to terminate acquisition of the frame data.

Since image quality of a still image is higher the closer pixels in frame data are to the pixels in the image data being generated, it possible to more reliably generate image data by synthesizing a number of frames of data appropriate to the image quality desired of the output image, so that it becomes possible to efficiently carry out the process of generating image data. In the present invention, the process of generating image data reliably by means of a simple arrangement may be carried out efficiently.

Incidentally, the aforementioned step (a) may be designed to receive input of information that affects the image quality of the output image, and on the basis of the input information acquire the image quality setting data, and on the basis of the acquired image quality setting data, to determine the number of frames of data for acquisition from the video data. Since image quality can be set through automatic determination of the number of frames of data synthesized by inputting information that affects image quality, convenience can be improved, while producing still images that better reflect user intent.

The information that affects image quality could conceivably consist, for example, of information such as a setting corresponding to a sliding adjustment tab for visually setting image quality and processing speed; resolution; number of pixels, or the like.

The step (b) may be designed to, while sequentially moving a pixel of note that generates the image data, perform a predetermined interpolation process using tone data for pixels, from among all of the pixels in the plurality of frames of data, that neighboring the pixel of note, and generate the image data from the interpolated tone data. Since image data for each pixel is generated by interpolation from tone data for neighboring pixels, it becomes possible to produce a still image of higher image quality.

The concept of the invention may be applied in various ways, for example, the image generating device may be worked independently, or in conjunction with some other method in the form of a combination with certain other devices, or otherwise modified appropriately.

The invention in another aspect thereof may reside in a method for carrying out a process corresponding to the module, according to a predetermined procedure. Accordingly, the invention may also be applied to a control method for an image generating device, to afford basically the same working effects.

The invention may also be applied to a printing control device for a printing device that performs printing on the basis of the generated image data; or as a printing system comprising such a printing control device and a printing device, to afford basically the same working effects.

When working the present invention, an aforementioned device may in some instances execute a predetermined program. Accordingly, [the invention] may also be applied to a control program for an image generating device; the present invention affords basically the same working effects. It is furthermore conceivable that a medium having such a program recorded thereon is distributed, and the program is read out from the recording medium by a compatible computer. That is, the invention is applicable to a computer-readable recording medium having the program recorded thereon, affords basically the same working effects.

Of course, the abovementioned arrangements may also be applied to the aforementioned method, printing control device, printing system, program, or medium having a program recorded thereon.

Here, the recording medium may be a magnetic recording medium, magneto-optical recording medium, or any other recording medium developed in the future. The copying stage, i.e. primary copy, secondary copy, etc., does not matter. The inventive concept includes also instances where certain functions are realized through hardware, or instances where certain functions are recorded on the recording medium, and read out appropriately as needed.

These and other objects, features, aspects, and advantages of the present invention will become more apparent from the following detailed description of the preferred embodiments with the accompanying drawings.

BRIEF DESCRIPTION OF THE DRAWINGS

FIG. 5 is a schematic illustration depicting detection of translation and rotation quantities;

FIG. 6 is an illustration of an example of image quality setting data;

FIG. 7 is a schematic illustration depicting superposition of a reference frame image and a target frame image;

FIG. 8 is a schematic illustration depicting estimation of translation quantity by a gradient method;

DESCRIPTION OF THE PREFERRED EMBODIMENTS

Figure 1:
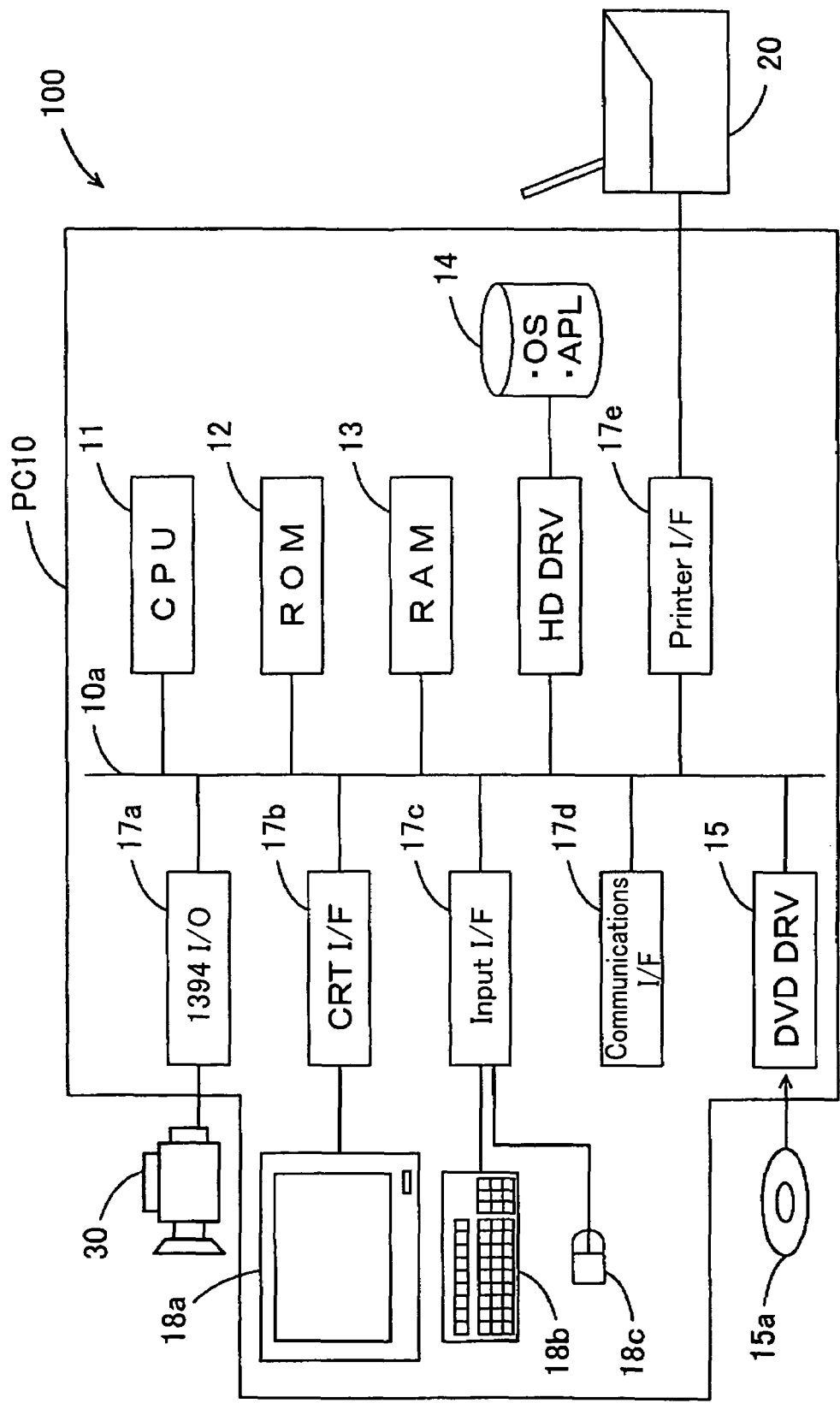
FIG. 1 is a simplified illustration of the arrangement of a printing system.

The embodiments of the invention are described hereinbelow, in the following order.
(1) Arrangement of Printing System
(2) Simplified Arrangement of Image Generating Device
(3) Example of Image quality Setting data
(4) Estimation of Camera Motion
(5) Processes Performed by Image Generating Device
(5-1) Synthesis Range Culling
(5-2) Detecting Translation and Rotation Quantities
(5-3) Correcting Frame Image Deviation
(5-4) Synthesizing Frame Images
(6) Embodiment 2
(7) Embodiment 3
(8) Embodiment 4
(9) Conclusion (1) Arrangement of Printing System FIG. 1 is a simplified illustration of the arrangement of a printing system 100 representing an embodiment of the invention. The printing system 100 comprises a personal computer (PC) 10, an ink jet printer 20 with color printing capabilities as a printing device (image output device), and the like. PC 10 serves as the image generating device of the invention, in the sense that it generates image data representing a still image (output image for the image output device) from data of a plurality of frames of video data. It also serves as the printing control device, in the sense that it generates image data and causes the printer 20 to print a still image corresponding thereto.

PC 10 comprises a CPU 11 that serves as the center for processing; the CPU 11 controls the entire PC 10 via a system bus 10*a*. To bus 10*a* are also connected ROM 12, RAM 13, a DVD-ROM drive 15, a 1394 I/O 17*a*, and several types of interface (I/F) 17*b-e*. Also connected, via a hard disk drive, is a hard disk (HD) 14. While a desktop PC is employed as the computer in this embodiment, any computer having a typical arrangement could be used.

On HD 14 are stored an operating system (OS), an application program (APL) for creating image data etc., and the like. When the software is run, CPU 11 transfers the appropriate portions to RAM 13, and runs the program while appropriately accessing RAM 13 as temporary workware.

The 1394 I/O 17*a* is an I/O in accordance with the IEEE 1394 standard, and is designed for connecting a digital video camera 30 or the like. This digital video camera 30 can generate video data for output to PC 10. To CRT I/F 17*b* is connected a display 18*a* for display of images based on frame data and image data; to input I/F 17*c* is connected a control input device, such as a keyboard 18*b* and or mouse 18*c*. To printer I/F 17*e* is connected printer 20, via a parallel I/F cable. Of course, printer 20 could also be connected via a USB cable or the like.

Printer 20 uses inks of the colors C (cyan), M (magenta), Ye (yellow), and K (black), ejecting the ink, in amounts corresponding to the tone value that make up the data, onto printing paper (printing medium) to print an image.

Of course, it would be possible to employ a printer using a number of inks other than four. Various types of printing device may be used, such as one a bubble type printer that generates bubbles in the ink flow passage in order to eject ink; a laser printer, or the like.

Figure 2:
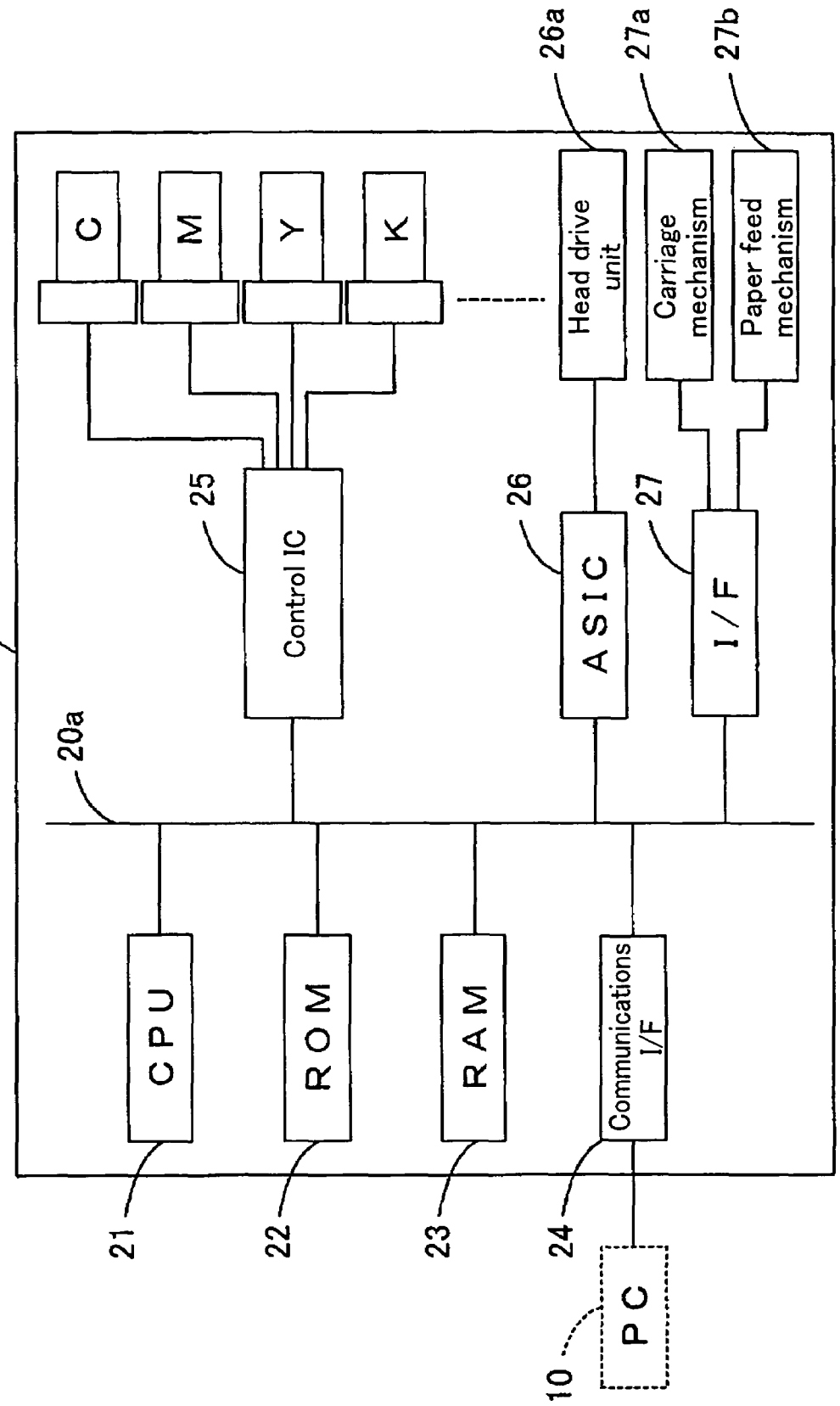
FIG. 2 is a block diagram illustrating the arrangement of a printer.

As shown in FIG. 2, in printer 20 a CPU 21, ROM 22, RAM 23, communications I/O 24, control IC 25, ASIC 26, I/F 27, and the like are interconnected via a bus 20*a*. Communications I/O 24 is connected to the printer I/F 17*e* of PC 10, enabling printer 20 to receive print jobs composed of CMYeK-converted data, page descriptors, etc. sent from PC10 via communications I/O 24. ASIC 26 exchanges predetermined signals with CPU 21 while outputting applied voltage data based on the CMYeK data to a head drive unit 26*a*. The head drive unit 26*a*, on the basis of the applied voltage data, generates an applied voltage pattern for application to piezo elements housed within the print head, and causes the print head to eject CMYeK inks. A carriage mechanism 27*a* and paper feed mechanism 27*b* connected to I/F 27 perform main scanning of the print head, and sub-scanning of the medium in successive feed increments, while performing page breaks at appropriate intervals. CPU 21 controls the various components according to the program read into ROM 22, while utilizing RAM 23 as workware.

On PC 10, BIOS is run on basis of the aforementioned hardware configuration, and the OS and APL are run on BIOS. The OS incorporates various drivers, such as printer drivers for controlling printer I/F 17*e*, and executes control of hardware. A printer driver enables two-way communication with printer 20, via printer I/F 17*e*, and creates a print job from data received from application APL, and sends it to the printer 20. While the image generating program of the present invention is composed of an APL, it could also be composed of a printer driver. HD 14 is the medium that stores the program; however, the medium could instead be, for example, a DVD-ROM 15*a*, CD-ROM, flexible disk, magneto-optical disk, nonvolatile memory, punch card, printed medium imprinted with symbols such as barcode, or the like. Of course, it would also be possible to download and execute via the Internet an aforementioned control program stored on a predetermined server, through communications I/F 17*d*.

An image generating device could also be designed through cooperation of the aforementioned hardware and the aforementioned program.

(2) Simplified Arrangement of Image Generating Device

Figure 3:
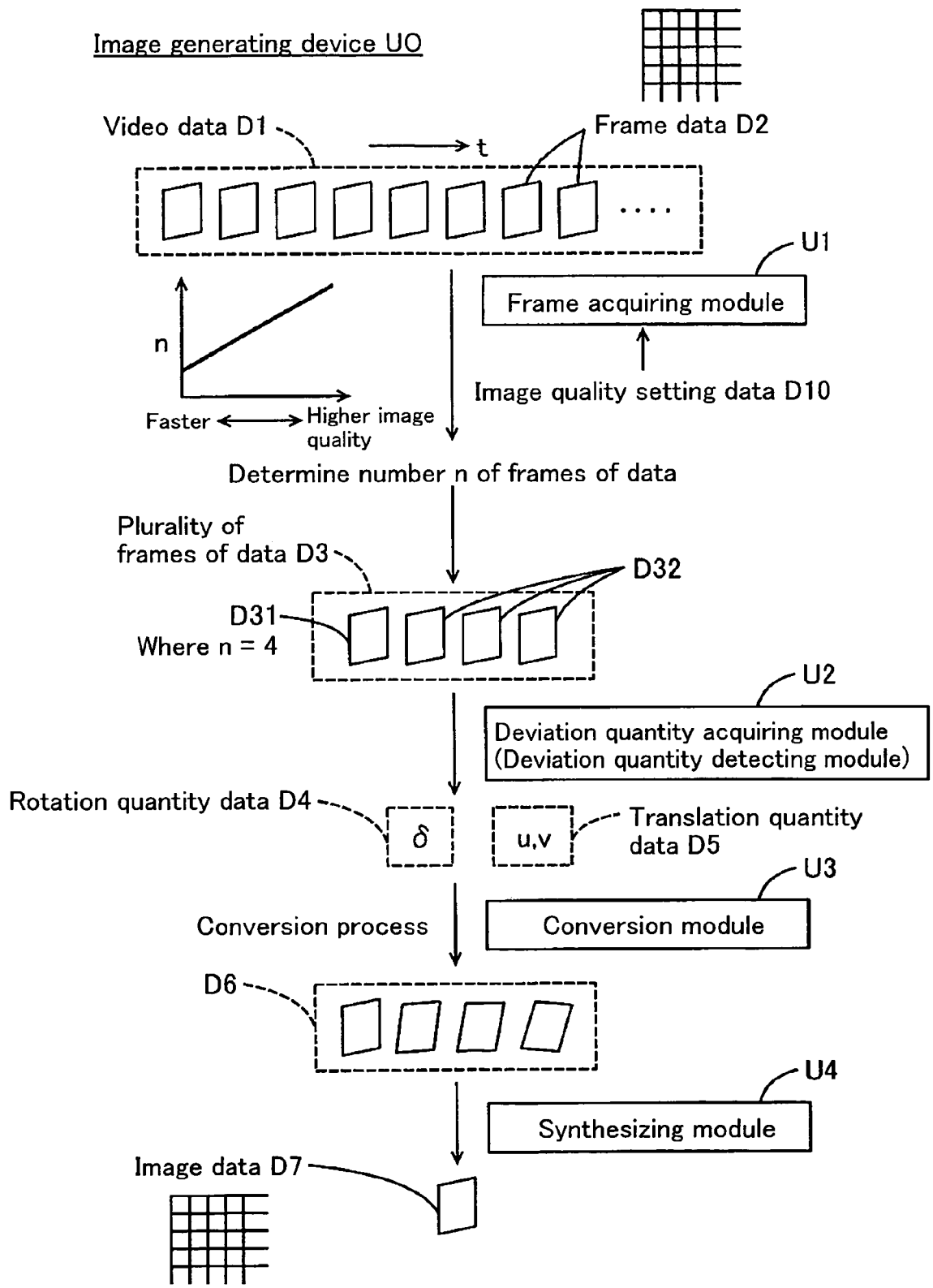
FIG. 3 is a schematic illustration showing a simplified arrangement of an image generating device.

FIG. 3 is a schematic illustration showing a simplified arrangement of the aforementioned image generating device. The image generation program that causes the PC to function as an image generating device U0 is composed of a plurality of modules that correspond to the various module described hereinbelow.

Video data D1 is composed of data D2 of a plurality of frames. Each set of frame data D2 consists of data for tone representation of an image with a multitude of pixels in a dot matrix arrangement. Frame data D2 represents data of a continuous time series. In the drawing, the time series is portrayed as going from left to right, that is, data further to the right occurs later in the time series. Initially, frame acquiring module U1 acquires image quality setting data D10 that enables setting of image quality of an image for output by printer 20, and on the basis of the image quality setting data D10 determines a number frames of data n (n is an integer equal to 2 or greater) to be acquired from video data D1. During this time, as shown in the graph in the drawing, the number of number frames of data for acquisition is increased the higher the image quality represented by the image quality setting data D10. Put another way, the number frames of data for acquisition is decreased the faster the data represented by the image quality setting data D10 is to be processed. Here, "n" is used merely to facilitate the description; since the selected number frames of data can be acquired later, it does not necessarily mean that data of the numerical value "n" is acquired.

Next, the selected number n of frames of data are acquired from the video data D1. In this embodiment, a plurality of frames of data D3 in a continuous time series are acquired from video data D1.

The initial set of frame data in the time series is designated as reference frame data D31, and subsequent frames of data (three in the illustrated example) are designated as target frame data D32. Of course, any of the plurality of frames of data could be selected as the reference frame data; the reference frame data need not be taken from the plurality of acquired frames of data.

Figure 4:
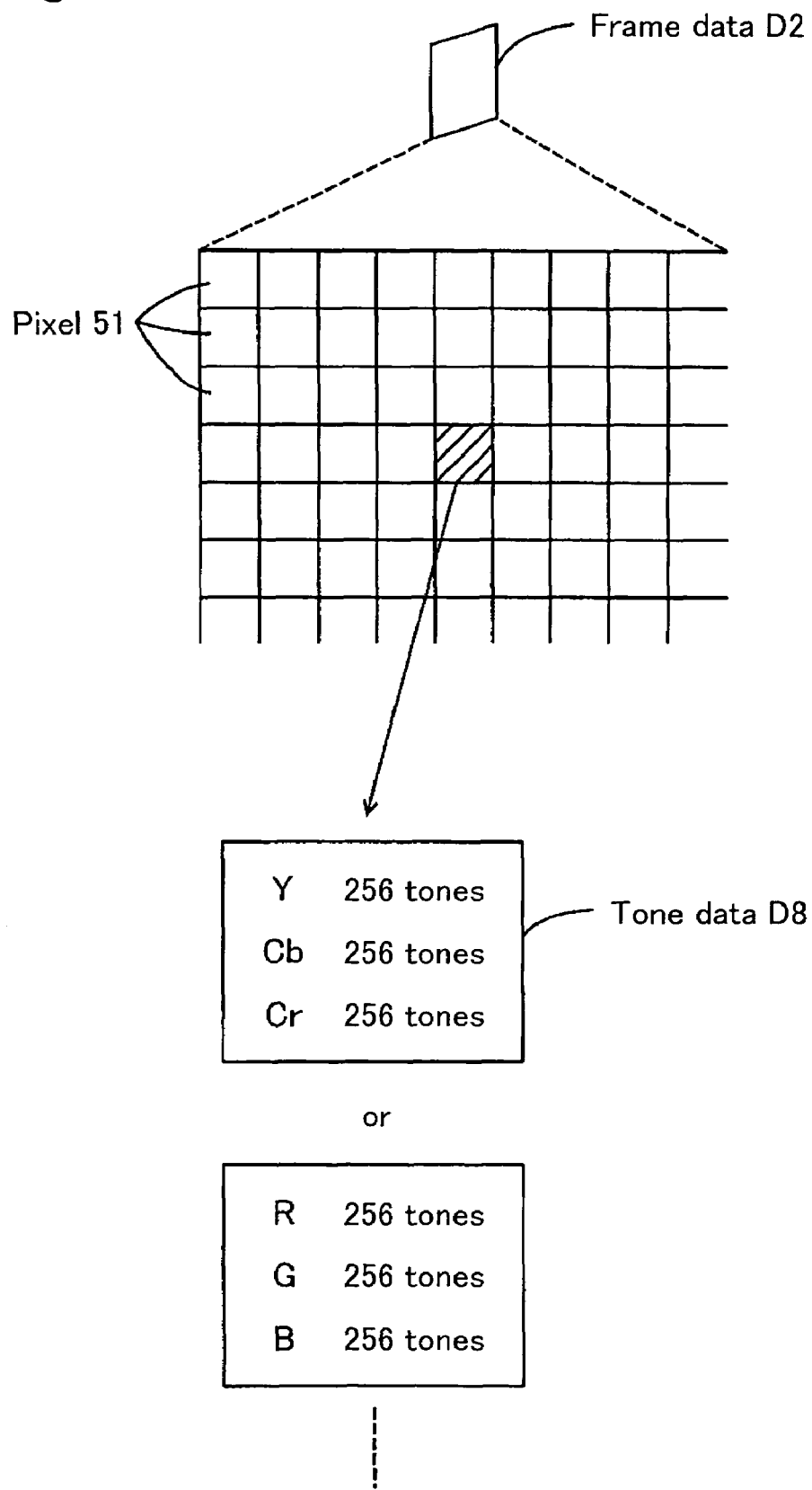
FIG. 4 is a schematic illustration showing the arrangement of frame data.

FIG. 4 is a schematic illustration showing the arrangement of frame data D2. As shown in the drawing, each frame of data D2 represents a frame image by means of tone data D8 for each of a multitude of pixels 51 in a dot matrix arrangement. In this embodiment, tone data D8 is described as being YCbCr data composed of Y (luminance), Cb (blue color difference), and Cr (red color difference) values, but could instead by RGB data composed of values for R (red), G (green), and B (blue). While each YCbCr is described as having 256 tone levels, these could instead have 1024 tone levels, 100 tone levels, or the like.

On the basis of the data D3 from the number of frames acquired by frame acquiring module U1, deviation acquiring module U2 detects a rotation quantity indicating rotational deviation among images represented by the plurality of frames of data, and a translation quantity indicating translational deviation (corresponds to deviation detecting module), and acquires rotation quantity data D4 and translation quantity data D5. In this embodiment, rotation quantity and translation quantity are detected in each of the target frames of data D32 remaining after the initial frame data in the time series has been selected as the reference frame data D31; however, it would be possible to detect rotation quantity and translation quantity in any of various ways, designating any of the data as reference frame data.

As shown in FIG. 5, the multitude of pixels in frame information are depicted on in x-y plane, with frame data 52a, b in the upper row shown in time series order, and frame data 52c, d in the lower row shown in time series order as well. When, as depicted in the upper row, an object 53a on frame data 52a undergoes translational motion without rotation, the motion distance u (=1 pixel) in the x-axis direction and the motion distance v (=2 pixels) in the y-axis direction represent the translation quantity, and constitute the "translation quantity data" referred to herein. When, as depicted in the lower row, an object 53c on frame data 52c undergoes rotational motion centered about the center 52c1 of frame image 53c, while the translation quantity (u, v) is (0, 0), this rotation quantity (δ) is designated as the rotation quantity data.

On the basis of locations of pixels in the plurality of frames of data D3 and tone data for these pixels, the deviation acquiring module U2 in this embodiment calculates rotational deviation and translational deviation, using an equation for calculating rotational deviation and translational deviation among images represented by a plurality of frames of data, by means of a least squares method, to derive rotation quantity data D4 and translation quantity data D5. The method for calculating rotational deviation and translational deviation shall be termed "estimation of camera motion."

On the basis of data D4 and D5, conversion module U3 performs a conversion process to rotate or translate at least one image represented by plurality of frames of data D3, to convert at least one of the plurality of frames of data D3 so as to minimize deviation among images. In order to eliminate deviation among images, the conversion module U3 of this embodiment converts at least one of the plurality of frames of data D3—specifically, target frame data D32—to generate a plurality of frames of data D6 having undergone the conversion process. At this time, locations of pixels of at least one of the plurality of frames of data are converted using units that are smaller than the pixels.

Here, when a first frame image is followed by a second frame image, (u, v) denotes the translation quantity, and (δ) the rotation quantity, going from the first frame image to the second frame image. For example, when eliminating deviation of the second frame image with respect to the first frame image, the second frame image will be subjected to translation by (−u, −v), and rotation by (−δ). Of course, it would also be possible to subject the first frame image to translation by (u/2, v/2) and rotation by (δ/2), and the second frame image to translation by (−u/2, −v/2) and rotation by (−δ/2).

Synthesizing module U4 synthesizes the converted plurality of frames of data D6 to generate image data D7. The number of frame data D6 for synthesis is that acquired by frame acquiring module U1. The image data represents an image for output by printer 20, by means of tone representation of each of a multitude of pixels in a dot matrix arrangement. While in this embodiment, image data D7 consists of RGB data representing 256 tone levels for each of the RGB components, it could instead consist of YCbCr data or the like, having 1024 tone levels, 100 tone levels, etc. In this embodiment, image data is assumed to have a different number of pixels than frame data, namely, to contain more pixels and have higher resolution than frame data.

Alternatively, the image data being generated may have the same number of pixels as the frame data, or fewer pixels than the frame data.

When synthesizing data of a plurality of frames, while sequentially moving the pixel of interest generating the image data, tone data for pixels neighboring the pixel of interest selected from among all of the pixels in the data of a plurality of frames is used to perform a predetermined interpolation process to calculate tone value for the pixel of interest, to generate image data D7 that represents a still image as tone values for each pixel.

In the prior art, the number of frames of data synthesized is fixed, and thus more processing time was needed to generate image data beyond that strictly needed for the desired image quality.

On the other hand, a still image represented by image data generated by the image generation device U0 herein is generated by synthesizing data from a number of frames determined automatically on the basis of image quality setting data that is able to set image quality of the output image, and thus by synthesizing data from a number of frames appropriate to the image quality of the output image, it becomes possible to efficiently derive a still image through an efficient process for generating the image data that represents the still image. In particular, the higher the image quality indicated by the image quality setting data, the greater the number of frames of data used for synthesis, so that a still image of higher image quality is obtained; and the lower the image quality indicated by the image quality setting data, the smaller the number of frames of data used for synthesis, enabling the still image to be obtained faster.

(3) Example of Image Quality Setting Data

FIG. 6 is an illustration of an example of image quality setting data.

The image quality improvement V, which is a coefficient multiplied by the ratio of the total number of pixels in the frame data to the total number of pixels in the image data being generated, is designated as image quality setting data (Example 1), for example. When the value of this ratio multiplied by the image quality improvement V is calculated, by selecting a number of frames for acquisition that generally coincides with this value, frame data may be acquired and synthesized in a number that affords an efficient process of generating image data representing a still image. As will be discussed later, the image quality improvement V is the same value as a image quality mode setting value that is set through control input in a image quality mode input field, a larger number being associated with a greater number of acquired frames of data, and higher image quality.

Image quality setting data (Example 2) could alternatively consist of a threshold value TH1 for the arithmetic mean of the distance to the closest pixel (distance summary value) among the pixels in the plurality of acquired frames of data, for each pixel in the image data. Where, for each pixel in the image data, distance to the closest pixel among the pixels in the plurality of acquired frames of data is calculated, and frame data is acquired until the average value of calculated distance equals or is less than threshold value TH1, frame data may be acquired and synthesized in a number that affords an efficient process of generating the image data.

Image quality setting data (Example 3) could alternatively consist of a threshold value TH2 for the arithmetic mean of the number of frames of data having pixels within a predetermined range (number summary value), for each pixel in the image data. Where, for each pixel in the image data, the number of frames of data having pixels within a predetermined range, and frame data is acquired until the average value of calculated number is equal to or greater than TH2, frame data may be acquired and synthesized in a number that affords an efficient process of generating the image data.

Image quality setting data (Example 4) could alternatively consist of a threshold value TH3 for the ratio of the number of pixels when, of the pixels in the image data, there are no pixels of frame data present within a predetermined range, to the total number of pixels of the image data. By calculating the number of pixels when the are no pixels of frame data present within a predetermined range, calculating the ratio thereof divided by the total number of pixels of the image data, and acquiring frame data until the calculated ratio is equal to or less than TH3, frame data may be acquired and synthesized in a number that affords an efficient process of generating the image data.

Higher image quality settings are associated with smaller threshold values TH1 and TH3, and a larger threshold value TH2.

The image quality setting data described above is stored on the HD in the form of an association table associated with image quality mode settings. The image quality setting data is read out, and a number of frames for acquisition determined on the basis of this image quality setting data, whereby a still image may be obtained efficiently.

(4) Estimation of Camera Motion

In this embodiment, by estimating camera motion, it is possible to correct not only translational deviation among frame images, but also rotational deviation among frame images. Estimation of camera motion refers to estimation of relative positional relationships among a plurality of frame images represented by a plurality of frames of data culled from video data. Here, it is assumed that there is no motion of the filmed subject per se or movement in the position of the video camera during filming, and that only the orientation of the video camera changes. In other words, all motion corresponds to the camera techniques known as pan and tilt. To facilitate the description, assuming a reference frame image represented by reference frame data followed by a target frame image represented by target frame data, deviation between the reference frame image and target frame image will be estimated.

As shown in FIG. 7, coordinates (x1, y1) of the reference frame data correspond to coordinates (x2, y2) of the target frame data. Translation quantity has (u, v), and rotation quantity has the center of the frame image, as the origin 8. Since it is assumed that the focal distance is unchanged during shooting, the following equations are used as equations for coordinate conversion, on the assumption that only translation and rotation are converted.

$$x2 = \cos \delta \cdot x1 + \sin \delta \cdot y1 - u \qquad (1)$$

$$y2 = -\sin \delta \cdot x1 + \cos \delta \cdot y1 - v \qquad (2)$$

Since the time difference between the reference frame image and target frame image is very small, u, v and δ are very small quantities. When δ is a very small quantity, $\cos \delta \approx 1$ and $\sin \delta \approx \delta$, so the above equations may be rewritten as follows.

$$x2 = x1 + \delta \cdot y1 - u \qquad (3)$$

$$y2 = -\delta \cdot x1 + y1 - v \qquad (4)$$

Estimation of camera motion is based on a gradient method that estimates pixel positions in units smaller than single pixels, using for example luminance of each pixel among frame data.

Here, as shown at top in FIG. 8, luminance of each pixel of reference frame data is denoted by z1 (ix, iy), and luminance of each pixel of target frame data by z2 (ix', iy').

First, assuming the target frame coordinates (ix', iy') to be situated between the reference frame data coordinates (ix~ix+1, iy=iy+1), the method for calculating coordinates (ix', iy') by the gradient method shall be described.

As shown in the middle of the drawing, where the position of coordinates (ix', iy') in the x-axis direction is ix+Δx, and Px=z1 (ix+1. iy) −z1 (ix. iy), Δx is calculated such that Px·Δx=z2 (ix'. iy')−z1 (ix. iy). In actual practice, Δx is calculated for each pixel, and averaged overall. Here, where denoted simply as z1=z1 (ix, iy) and z2=z2 (ix', iy'), Δx may be calculated such that the following equation is true.

$$\{Px \cdot \Delta x - (z2 - z1)\}^2 = 0 \qquad (5)$$

As shown at bottom in the drawing, where the position of coordinates (ix', iy') in the y-axis direction is iy+Δy, and Py=z1 (ix, iy+1)−z1 (ix, iy), Δy is calculated such that Py·Δy=z2 (ix', iy')−z1 (ix, iy). Here, where denoted simply as z1=z1 (ix, iy) and z2=z2 (ix', iy'), Δy may be calculated such that the following equation is true.

$$\{Py \cdot \Delta y - (z2 - z1)\}^2 = 0 \qquad (6)$$

Considering now both the x and y directions, Δx and Δy that minimize $S^2$ in the following equation may be calculated by the method of least squares.

$$S^2 = \Sigma \{Px \cdot \Delta x + Py \cdot \Delta y - (z2 - z1)\}^2 \qquad (7)$$

A method for calculating, by means of a gradient method, translation quantity where a frame image has undergone translation in the x-axis direction and y-axis direction was described above. In the present invention, rotation of a frame image is taken into consideration as well. The method for doing so is now described.

Figure 9:
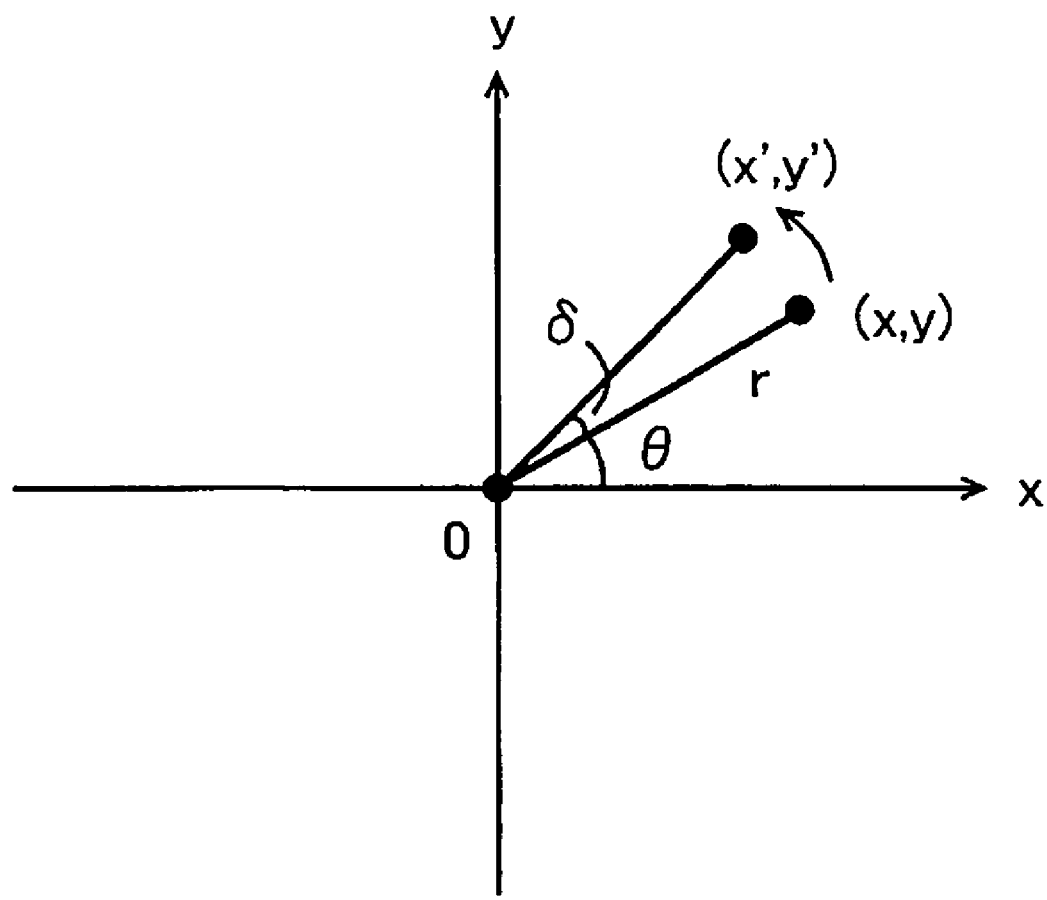
FIG. 9 is a schematic illustration depicting rotation quantity of a pixel.

As shown in FIG. 9, where r denotes distance from the origin O of coordinates (x, y) of reference frame data and θ the angle of rotation from the x-axis, r and θ are calculated by the following equations.

$$r = (x2 + y2)^{1/2} \qquad (8)$$

$$\theta = \tan^{-1}(x/y) \qquad (9)$$

Here, with translational error corrected, the origins of the reference frame image and target frame image aligned, and the target frame image having undergone δ rotation from coordinates (x, y) to (x', y'), movement in the x-axis direction and movement in the y-axis direction produced by this rotation is calculated from the following equations.

$$x' - x \approx -r\delta \sin \theta = -\delta \cdot y \qquad (10)$$

$$y' - y \approx r\delta \cos \theta = \delta x \qquad (11)$$

Δx and Δy in Equation (7) above may thus be represented as per the following equations, using the translation quantity u, v and rotation quantity δ.

$$\Delta x = u - \delta \cdot y \qquad (12)$$

$$\Delta y = v + \delta \cdot x \qquad (13)$$

Substituting these into Equation (7) gives the following equation.

$$S^2 = \Sigma \{Px \cdot (u - \delta \cdot y) + Py \cdot (v + \delta \cdot x) - (z2 - z1)\}^2 \qquad (14)$$

That is, where reference frame data coordinates are (ix, iy), and coordinate values and tone data (luminance values) for all pixels of the reference frame data are substituted into Equation (14), values of u, v and δ that minimize $S^2$ are calculated using the least squares method. The following equations can be obtained by the least squares method.

$$u=\{(m_\delta \cdot M02-m_v^2)c_u+(m_u \cdot m_v-m_\delta \cdot M11)c_v+(m_v \cdot M11-m_u \cdot M02)c_\delta\}/d \quad (15)$$

$$v=\{(m_u \cdot m_v-m_\delta \cdot M11)c_u+(m_\delta \cdot M20-m_u^2)c_v+(m_u \cdot M11-m_v \cdot M20)c_\delta\}/d \quad (16)$$

$$\delta=\{(m_v \cdot M11-m_u \cdot M02)c_u+(m_u \cdot M11-m_v \cdot M20)c_v+(M20 \cdot M02-M11^2)c_\delta\}/d \quad (17)$$

It should be noted that i represents a number for distinguishing all pixels; and α, β, D, N1-N5 and M are calculated as follows.

$$Pt_i = z2-z1 \quad (18)$$

$$k_i = x_i Py_i - y_i Px_i \quad (19)$$

$$M20 = \sum_i Px_i^2 \quad (20)$$

$$M11 = \sum_i Px_i Py_i \quad (21)$$

$$M02 = \sum_i Py_i^2 \quad (22)$$

$$m_u = \sum_i k_i Px_i \quad (23)$$

$$m_v = \sum_i k_i Py_i \quad (24)$$

$$m_\delta = \sum_i k_i^2 \quad (25)$$

$$c_u = \sum_i Px_i Pt_i \quad (26)$$

$$c_v = \sum_i Py_i Pt_i \quad (27)$$

$$c_\delta = \sum_i k_i Pt_i \quad (28)$$

$$d = m_\delta(M20 \cdot M02 - M11^2) - (m_u^2 \cdot M02 - 2m_u \cdot m_v \cdot M11 + m_v^2 \cdot M20) \quad (29)$$

Accordingly, using the above Equations (15)-(29) which calculate rotational deviation and translational deviation among frame images by the least squares method, translation quantity (u, v), and rotation quantity (δ) attributed to camera motion can detected and acquired by way of translation quantity data and rotation quantity data. Here, since the unit for translation quantity is smaller than the pixels that make up the frame image, detection is possible with a high degree of accuracy. By synthesizing a plurality of frames of data using the detected translation and rotation quantities, still images of high image quality can be derived from data of a plurality of frames of video data.

Alternatively, before performing the aforementioned estimation, detection of translation quantity in pixel units may be carried out for translational deviation only, correcting translational deviation between frame images in pixel units (i.e. roughly). By so doing it is possible to acquire translation quantity data and rotation quantity data more accurately; and by synthesizing a plurality of frames of data using these translation and rotation quantities, to derive still images of higher image quality.

Figure 10:
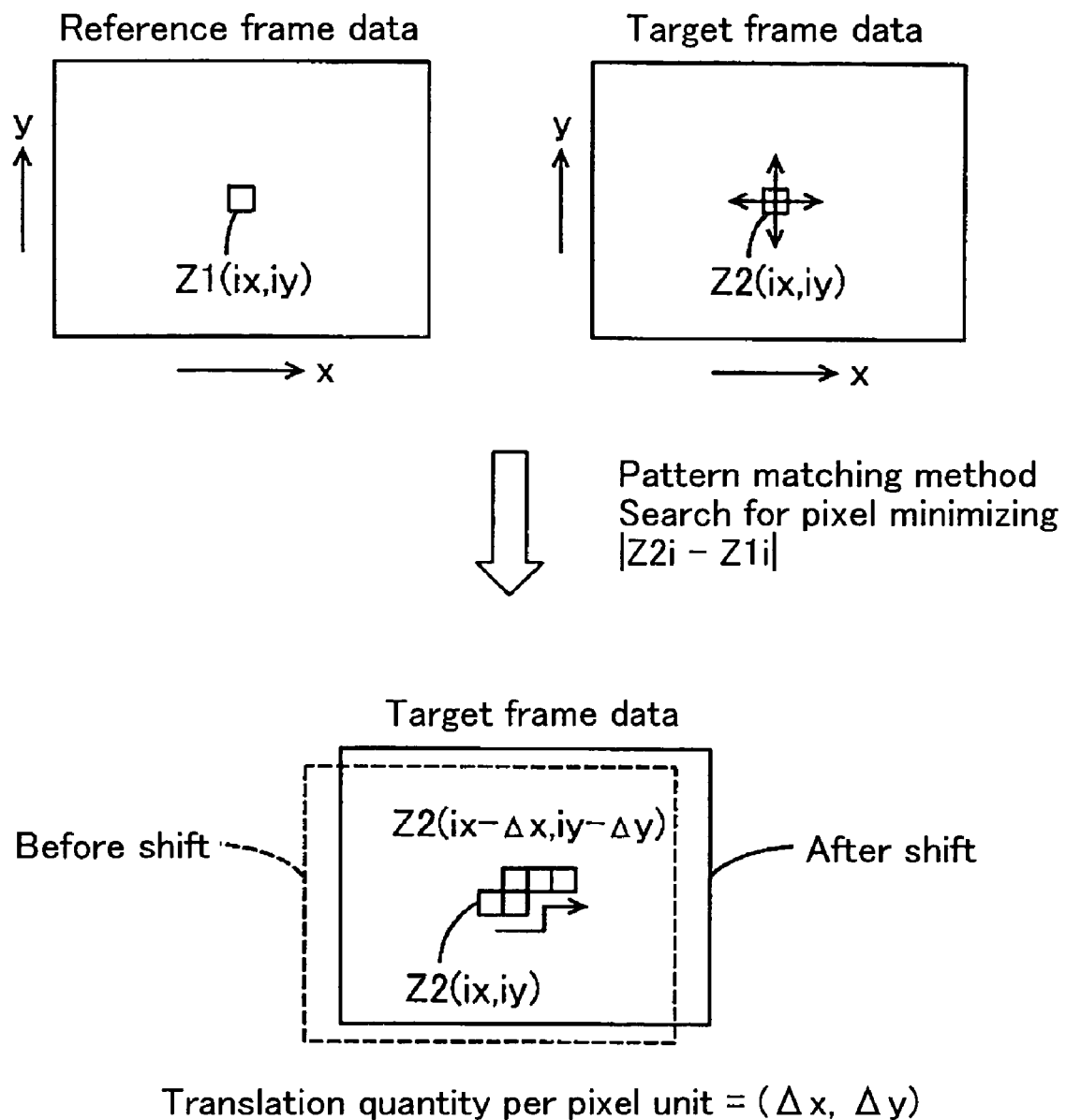
FIG. 10 is a schematic illustration depicting estimation of translation quantity by a pattern matching method.

The pattern matching method, shown in FIG. 10, is a known estimation method for roughly detecting translational deviation between frame images. As shown at top in the drawing, luminance of each pixel of the reference frame data is denoted z1(ix, iy), and, luminance of the pixel at the same location in target frame data is denoted z2(ix, iy).

Taking as a standard a case of associating a pixel (ix, iy) in reference frame data with a pixel (ix, iy) in target frame data, the target frame data is shifted in one-pixel units in the x-direction or y-direction while searching from a position that gives the smallest value for L, defined below.

$$L = |Z2_i - Z1_i| \quad (30)$$

or $$L = (Z2_i - Z1_i)^2 \quad (31)$$

At completion of the search, when the position of the pixel of target frame data associated with pixel (ix, iy) of the reference frame data is now (ix−Δx, iy−Δy), translation quantity from the reference frame image to the target frame image can be expressed in pixel units as (Δx, Δy).

By then shifting the pixels of the target frame image by this translation quantity (Δx, Δy), camera motion can be estimated with a high degree of accuracy.

(5) Processes Performed by Image Generating Device

Following is a detailed description of processes performed by the image generating device, and operation.

Figure 11:
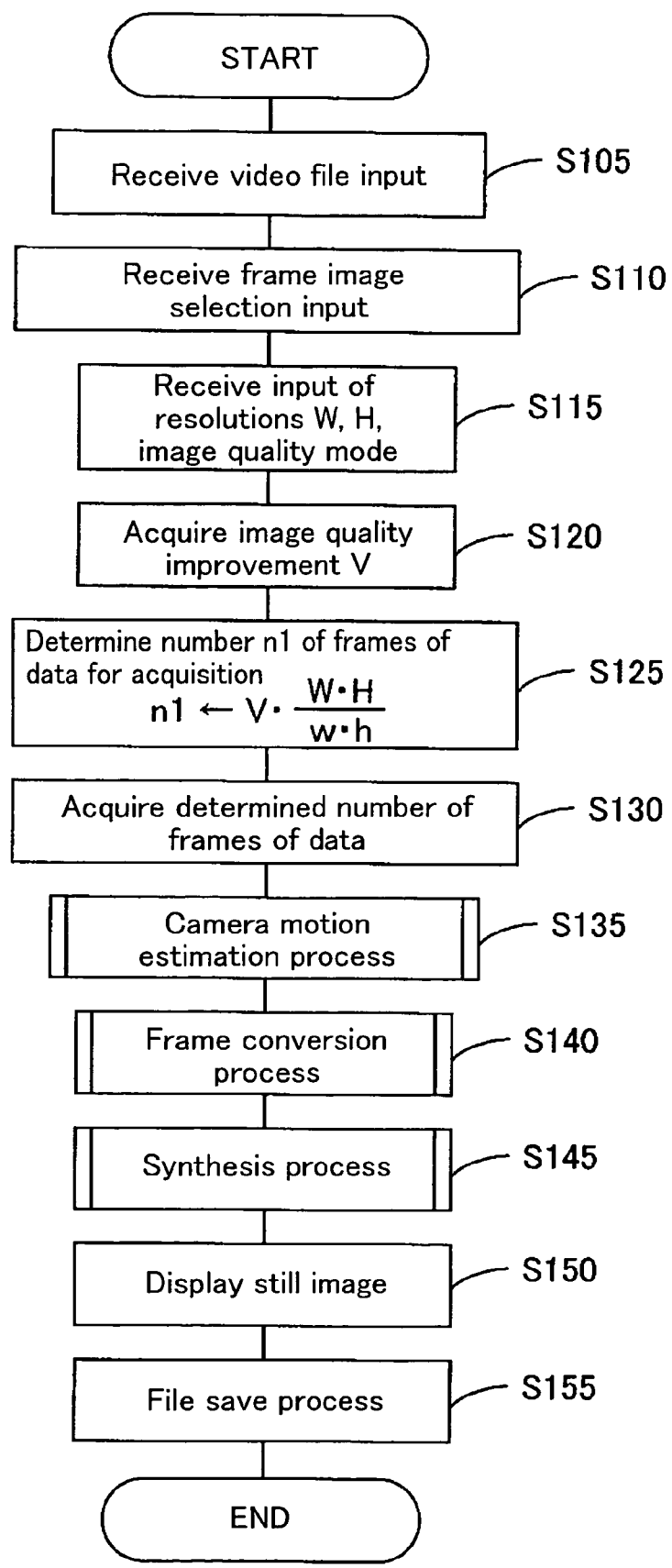
FIG. 11 is a flowchart depicting processes performed by the image generating device.

FIG. 11 is a flowchart depicting processes performed by the image generating device. Specifically, the processes are executed by CPU 11 of PC 10, according to an image generating APL. The APL is an application for generating, as a still image, a selected scene taken from a video played back on the PC. This still image is not simply a single culled frame, but rather a very fine image synthesized from a plurality of frames.

(5-1) Synthesis Range Culling

When the image generating APL is run, first, a video file selection screen (not shown) is displayed on the display monitor, the video file selection input by the user of the image generating device is received, and data indicating the memory address of the video file is acquired (S105. Hereinafter, the designation "Step" shall be omitted.) Next, input that selects, from among the multitude of frame images of the video display by the video file, a number of frame images for generation is received, and data indicating the addresses of the corresponding frames of data is placed in RAM as pointer data (S110).

Figure 12:
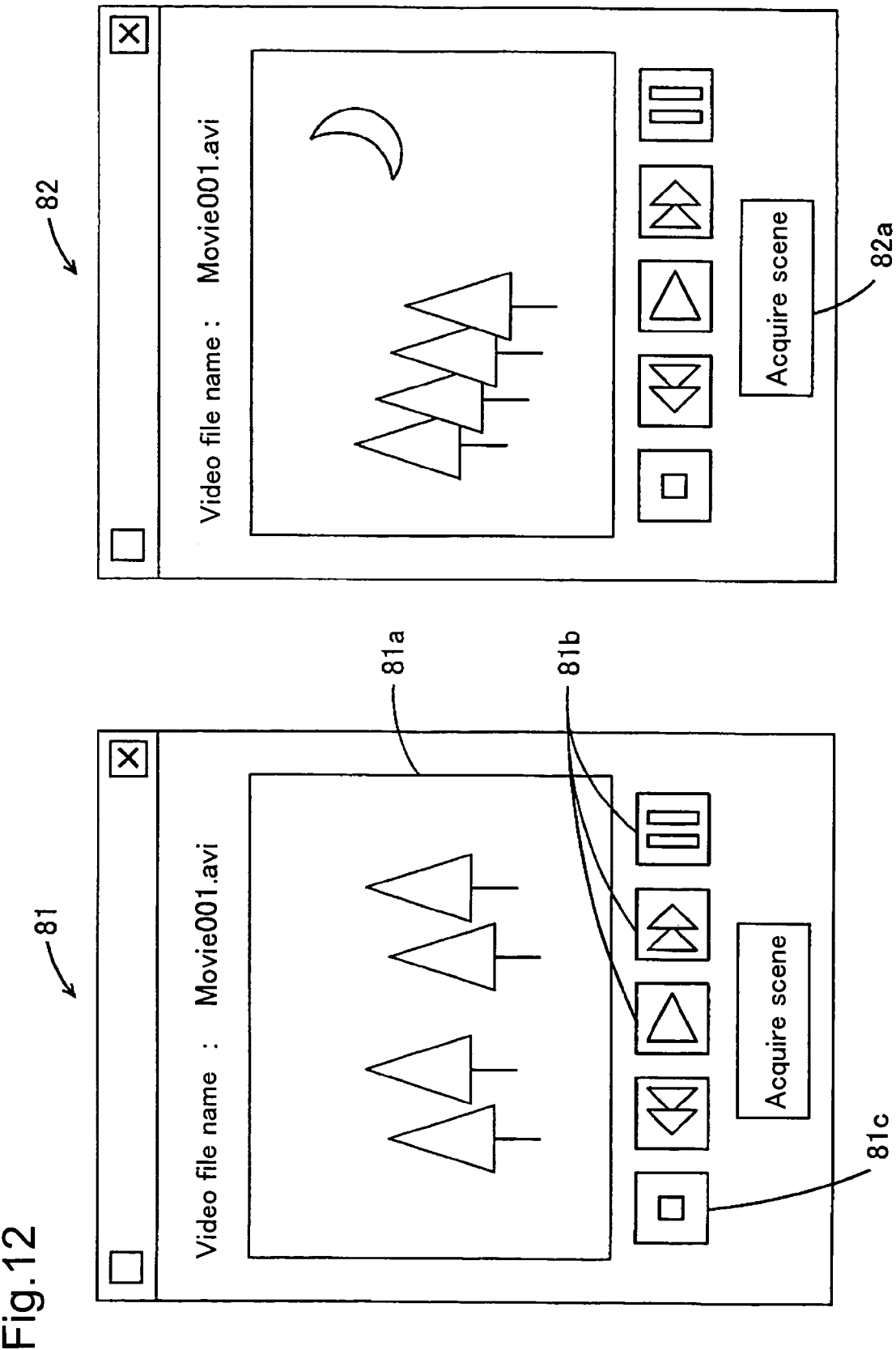
FIG. 12 is an illustration of an exemplary display of a frame image selection screen.

FIG. 12 illustrates a frame image selection screen. When the video file is opened, data from the leading frame in the time series is acquired from the video data composed of a multitude of frames of data stored in the video file, and the initial screen 81 shown at left in the drawing is displayed. The frame data consists of data representing the image by YbCbCr data (tone data) on an individual basis for the multitude of pixels. In the screen display field 81a of screen 81, a frame image based on the leading frame data is displayed. Below the screen display field 81a are disposed various buttons 81b, c; by clicking on these buttons with the mouse, the user can move to a desired scene. When an operation is performed by clicking a control button 81b, the pointer information is changed and the frame image updated in response to the operation. When an operation is performed by clicking the control button 81c, a frame image is displayed on the basis of the frame data at the corresponding memory address. A frame image selection screen 82 displayed at this time is shown at right in the drawing.

When an operation is performed by clicking the scene acquisition button 82a, the frame image selection input is received, and the system moves to a process to acquire the scene as a still image.

Figure 13:
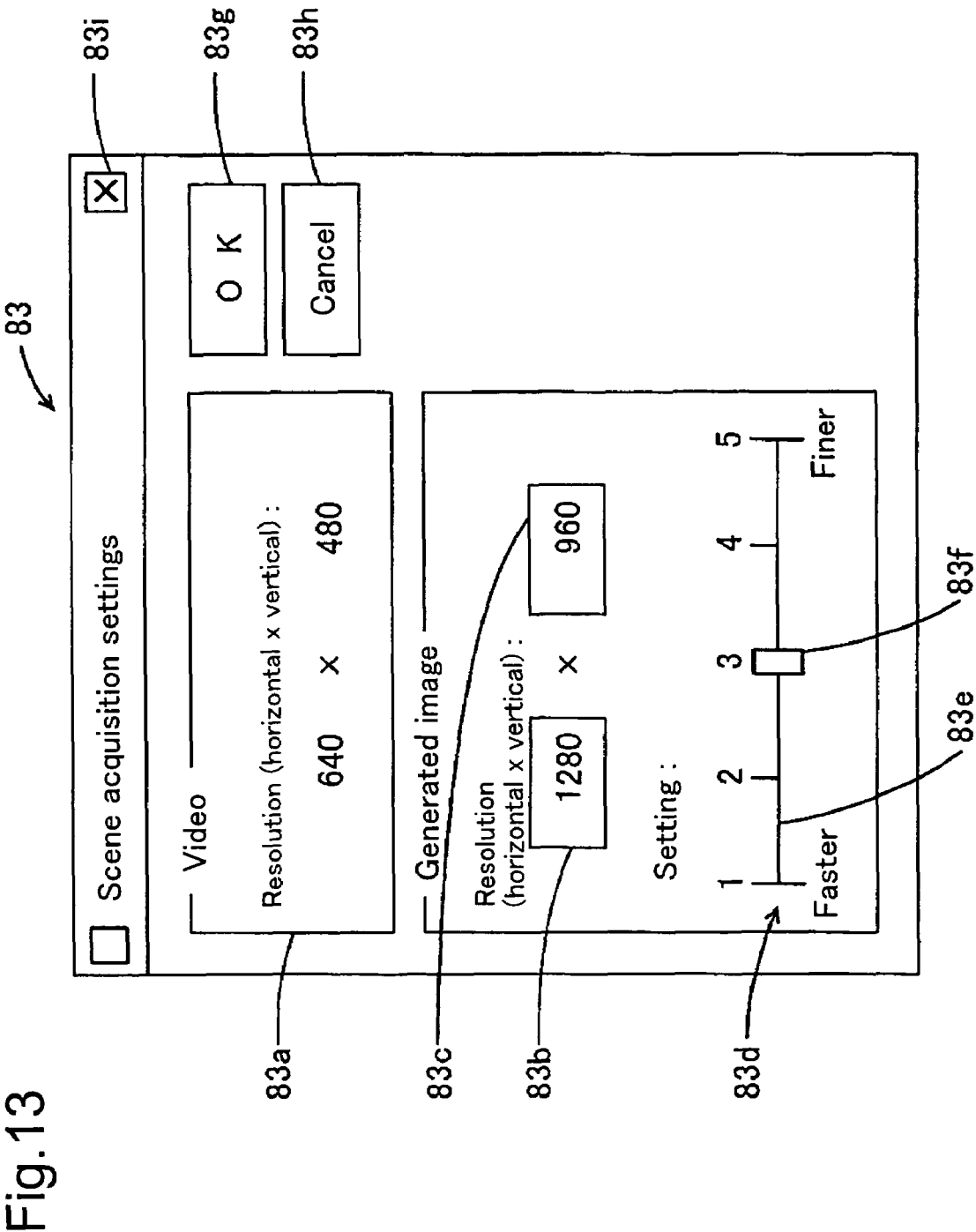
FIG. 13 is an illustration of an exemplary display of a scene acquisition screen.

Immediately thereafter, a scene acquisition settings screen dialog box 83 such as that depicted in FIG. 13 is displayed, and horizontal resolution (x-axis direction pixel count) W, vertical resolution (y-axis direction pixel count) H, and image quality mode setting inputs are received (S115). In dialog box 83, native resolution of frame images to be synthesized is displayed in a video resolution display field 83a; also displayed are resolution input fields 83b, c enabling resolution of the image being generated to be set to any desired values, a image quality mode input field 83d allowing image quality of the image being generated to be set to any of five levels, and various buttons 83g, h. The horizontal resolution input field 83b receives control input of horizontal resolution to acquire a value for W, and the vertical resolution input field 83c receives control input of vertical resolution to acquire a value for H. In the image quality mode input field 83d are displayed a linear slot 83e and a sliding adjustment tab 83f, adjustable along slot 83e with the mouse. Here, five image quality mode levels are provided, ranging from a fast (high speed) mode at the left end, to a fine (highest quality) mode at the right end. The acquired image quality mode settings are numbered 1, 2, 3, 4, 5 in order as the sliding adjustment tab 83f moves from left to right. In the illustrated example, clicking the OK button 83g will select for the image being generated the pixel counts of W=1280, H=960, and a image quality mode setting of 3. In this way, pixel count and image quality of the image being generated can e set from the dialog box 83.

Since, in this way, the pixel count (resolution) of a still image can be changed, and image quality can be altered, it becomes possible to derive a still image as intended. Since this image generating device can generate image data representing a still image of high image quality by synthesizing a plurality of frames of data, the still image can be set to a higher resolution than the frame images, making it possible to derive a still image of high image quality having an increased number of pixels, so that it is possible to derive a still image as intended.

Alternatively, magnification or printing size could be set instead of resolution.

When the OK button is clicked, image quality improvement V, which enables setting of image quality of the output image, is acquired on the basis of the image quality mode setting (S120). In this embodiment, the image quality mode setting value is used as-is as image quality improvement V, as indicated in FIG. 6; however, the image quality improvement V may be different from the image quality mode setting value.

Next, on the basis of the image quality improvement V, a number n1 of frames of data for acquisition from the video data is determined (S125). Where w denotes frame data horizontal pixel count, h denotes vertical pixel count, and n1 denotes the number of frames of data for synthesis, total pixel count V of frame data prior to synthesis, per pixel in the still image synthesized therefrom, is represented by the following equation.

$$V = n1 \cdot (w \cdot h)/(W \cdot H) \qquad (32)$$

Here, where Sx denotes magnification in the horizontal direction and Sy magnification in the vertical direction, since Sx=W/w and Sy=H/h, [V] may be represented by the following equation as well.

$$V = n1/(Sx \cdot Sy) \qquad (33)$$

Since the value of the image quality improvement V represents data density per pixel, and is a value intimately related to image quality, the value of V may serve as an index of image quality improvement.

The preceding Equations (32), (33) can be rewritten as follows.

$$n1 = V \cdot (W \cdot H)/(w \cdot h) \qquad (34)$$

$$n1 = V \cdot (Sx \cdot Sy) \qquad (35)$$

Accordingly, when in the course of synthesizing data of a plurality of frames, pixel count or a magnification factor is specified, the number n1 of frames of data needed for synthesis can be determined by specifying image quality improvement V, which is an index of the image quality. In S125, number n1 of frames of data for acquisition is calculated on the basis of the total number of pixels w·h in the frame data and the image quality improvement V, using the above Equation (34). By using Equation (34) or (35), number of frames of data for synthesis can be calculated prior to synthesis, by means of a simple arrangement.

Here, since a greater value of image quality improvement V is associated with a greater value for image quality mode setting, a larger image quality improvement V represents higher image quality of data, and a larger number of frames of data for acquisition, so that it is possible to derive a still image of higher image quality. Conversely, a smaller image quality improvement V represents faster processing of data, and fewer frames of data for acquisition, so that the process of generating image data representing a still image can be carried out faster. Accordingly, it is possible to derive a still image by means of an efficient process.

Once a number of frames of data has been determined, the data from the determined number of frames is acquired from the video data (S130). Where the determined number of frames n1 is not an integer, n1 is rounded off, or everything past the decimal point rounded or dropped, to give an integer value for the number of frames to be acquired. In this embodiment, successive frame data in a time series is acquired from the video data; however, even where data is acquired from a plurality of discrete frames that are not successive in a time series, it is nevertheless possible to detect translation quantity and rotation quantity, and synthesize the frame data to produce a still image. For example, where video data is composed of both independent frame data all of whose pixels have tone data and that can represent an image without reference to additional frame data, and non-independent frame data not all of whose pixels have tone data and that cannot represent an image without reference to additional frame data, it is nevertheless possible to rapidly carry out the following camera motion estimation process, by referring exclusively to data of discrete independent frames.

In the manner described hereinabove, PC 10, which performs the processes of S105-S130, constitutes frame acquiring module.

(5-2) Detecting Translation and Rotation Quantities

Subsequently, deviation acquiring module and deviation detecting module perform a camera motion estimation process for estimating translation quantity and rotation quantity of frame images resulting from camera motion, to acquire translation quantity data and rotation quantity data (S135).

Figure 14:
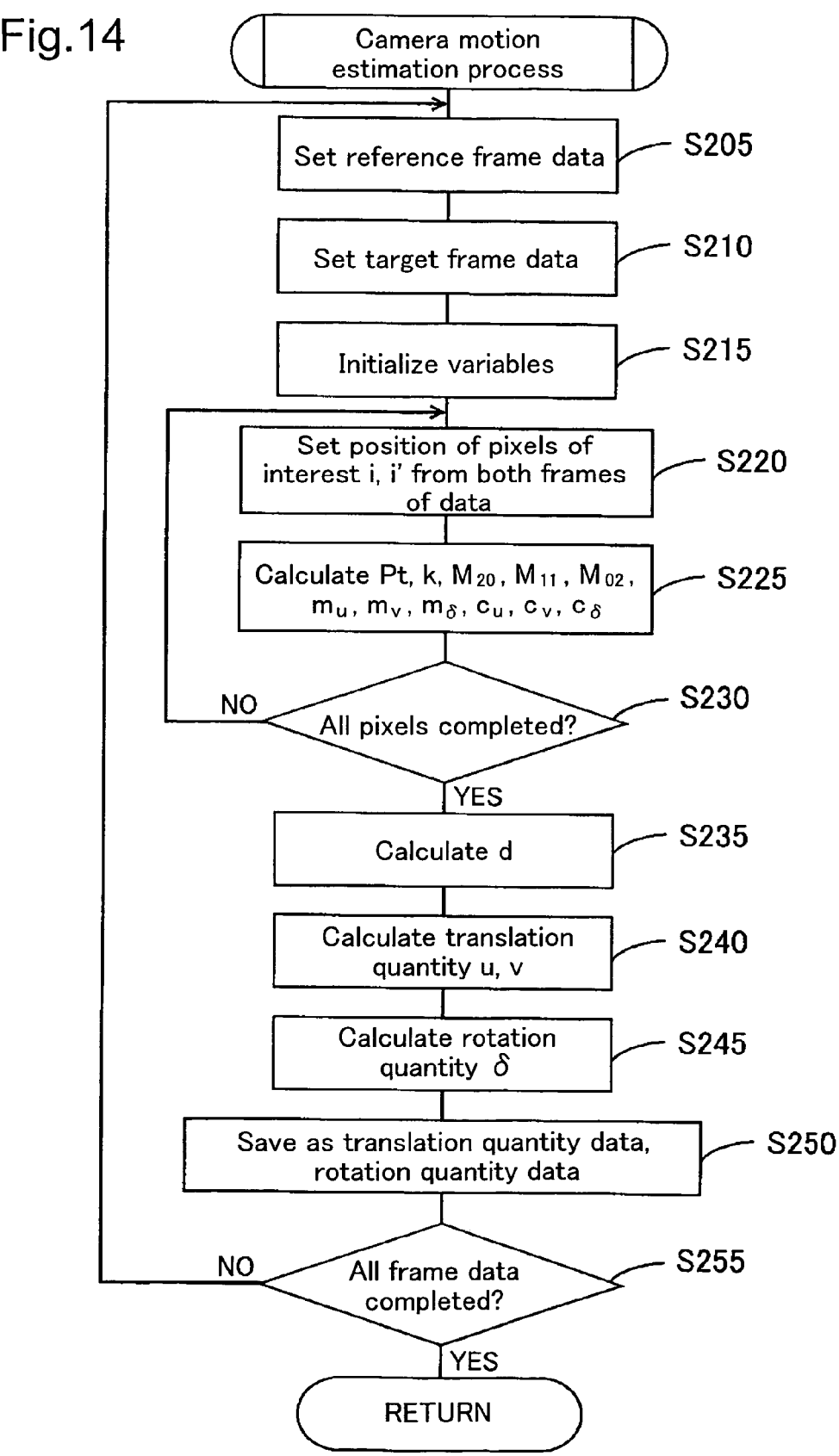
FIG. 14 is a flowchart depicting a camera motion estimating process.

FIG. 14 is a flowchart depicting the camera motion estimating process.

First, reference frame data is established from a plurality of frames of data acquired from video data (S205). In this embodiment, the initial set of frame data in the time series is established as reference frame data. Here, reference frame data may be established by placing the frame data selected as the reference frame data in a predetermined area of RAM; or reference frame data may be established by placing in a predetermined pointer in RAM the memory address of the frame data selected as the reference frame data.

Next, target frame data is established from a plurality of frames of data acquired from video data (S210). For example, the second set of frame data in the time series may be established as target frame data, or target frame data otherwise selected from among the acquired frames of data excluding that selected as the reference frame data. Here as well, frame data selected as target frame data may be placed in a predetermined area of RAM, or the memory address or frame data selected as target frame data placed in a predetermined pointer.

Next, the variables (parameters) used in the aforementioned Equations (15)-(29) to calculate, by the method of least squares, translation quantity u, v representing translational deviation and rotation quantity δ representing rotational deviation are initialized (S215). For example, 0 is substituted into the variables M20, M11, M02, $m_u$, $m_v$, $m_δ$, $c_u$, $c_v$, $c_δ$, used to calculate the sum.

Next, the position of a pixel of note i is established from the reference frame data, and the position of a pixel of note i' is established from the target frame data (S220). For example, where frame data is composed of horizontal (x-axis direction) nx pixels and vertical (y-axis direction) ny pixels in a dot matrix arrangement, when a pixel of coordinates (ix, iy) in the reference frame data is selected as the pixel of note, the position of pixel of note i can be established by i=ix+nx×iy; and when a pixel of coordinates (ix', iy') in the target frame data is selected as the pixel of note, the position of pixel of note i' can be established by i' =ix'+nx'×iy'. In this embodiment, the order in which positions of pixels of note are established begins at the pixel at upper left and proceeds in order to the pixel at upper right, and subsequently proceeds one at a time from the pixel at the left end therebelow in order to the pixel at the right end, until finally reaching the pixel at lower right. This procedure for establishing positions of pixels of note is the same in the various processes described hereinafter. Of course, the order of establishing positions of pixels of note can be modified appropriately, using a different order depending on the type of frame image, or the like.

Prior to carrying out the process of S220, it is acceptable to detect and acquire rough translation quantity (Δx, Δy) from the reference frame image to a target frame image is by means of the pattern matching process described earlier, and shift pixels by the translation quantity (Δx, Δy) only.

Once the positions of pixels of note i, i' have been established, values of $Pt_i$, $k_t$, M20, M11, M02, $m_u$, $m_v$, $m_δ$, $c_u$, $c_v$, and $c_δ$ for use in the above Equations (18)-(28) are calculated in succession (S225).

For example, for M20, since it is necessary to calculate the sum, for variable M20 the operation:

$$M20 \leftarrow M20 + (\text{values of pixels of note i, i' within } \Sigma)$$

i.e. a process for adding values of pixels of note i, i' within Σ, is performed.

Next, a determination is made as to whether calculations for each variable have been made for each pixel of reference frame data (S230). In the event that there are some remaining pixels for which the variables have not yet been calculated, the process of S220-S230 is performed repeatedly while sequentially moving the pixels of note i, i' for which the variables are calculate; or in the event that the variables have been calculated for all pixels, the routine proceeds to S235.

In S235, d is calculated using Equation (29) given above.

Next, translation quantity u, v is calculated using the above Equations (15), (16) (S240), and rotation quantity δ is calculated using the above Equation (17) (S245). Specifically, translation quantity and rotation quantity representing translational deviation and rotational deviation among images represented by a plurality of frames of data is detected in units finer than single pixels, and translation quantity data and rotation quantity data are obtained as translation quantity u, v and rotation quantity δ. u, v and δ are then stored in a predetermined area of RAM (S250).

Subsequently, a determination is made as to whether u, v and δ have been acquired for all frame data (S255). In the event there are remaining frames of data for which u, v and δ have not been acquired, target frame data is acquired in the time series order, and the process of S205-S255 performed repeatedly until u, v and δ have been acquired for all frame data, at which point the flow terminates.

By means of the process described above, translation quantity (u, v) and rotation quantity (δ) can be detected, and acquired as translation quantity data and rotation quantity data. During this time, since position conversion of pixels of frame data is carried out with a high degree of accuracy in units smaller than pixels, it is possible to obtain still images of high image quality. Additionally, by using a computational equation to calculate rotational deviation and translational deviation among frame images by means of the least squares method, it becomes possible to detect rotation quantity and translation quantity rapidly, whereby the process of generating image data can be accelerated.

Translation quantity data and rotation quantity data obtained by multiplying u, v and δ by predetermined correction coefficients, depending on the nature of the frame image, etc., may also be employed.

(5-3) Correcting Frame Image Deviation

Next, proceeding to S140 in FIG. 11, the conversion module executes a conversion process to convert the target frame data on the basis of translation quantity data and rotation quantity data, by translating and rotating the target frame data so as to eliminate deviation with respect to the reference frame data.

Figure 15:
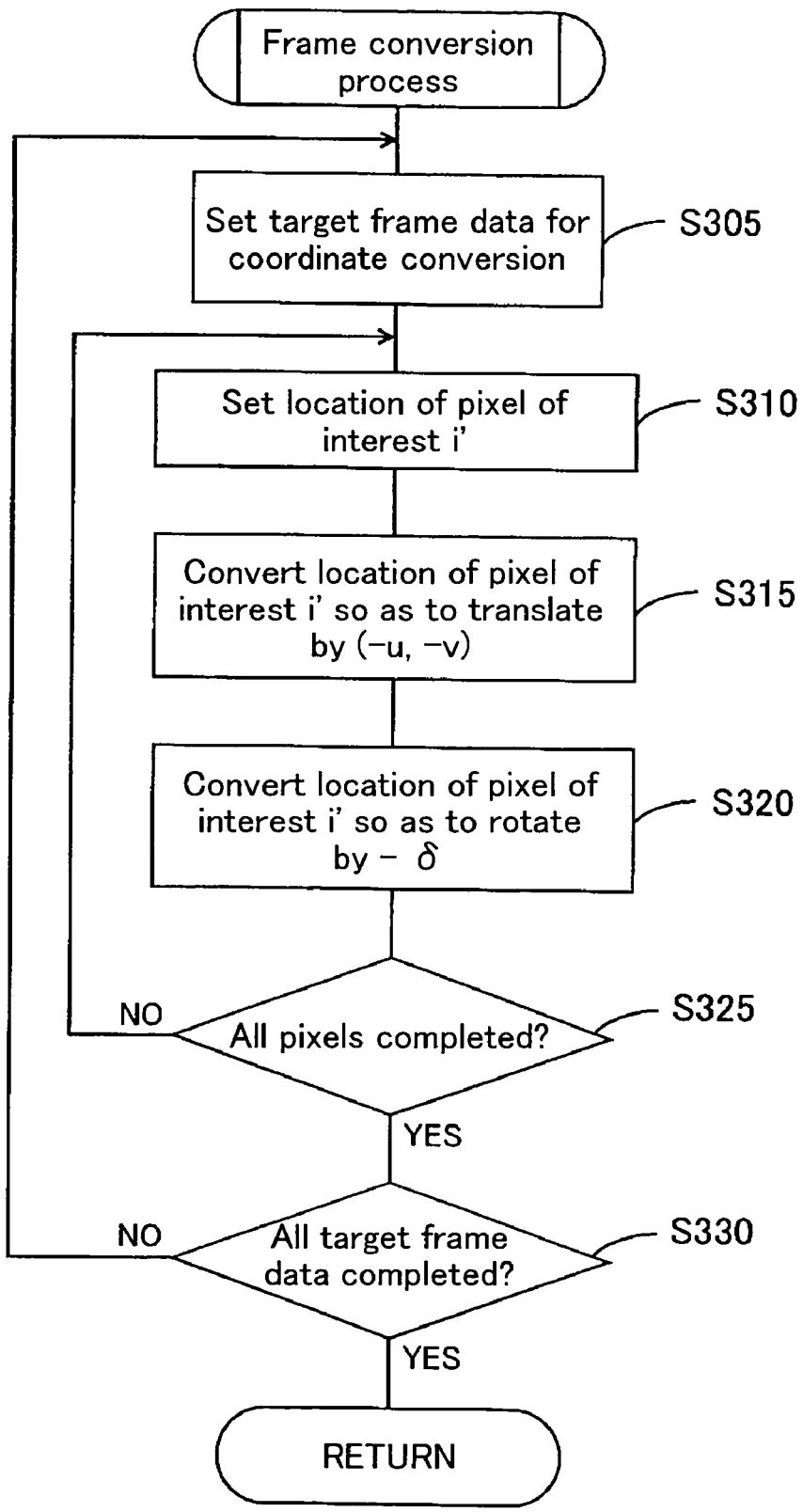
FIG. 15 is a flowchart depicting a frame conversion process.

FIG. 15 is a flowchart depicting the frame conversion process.

Initially, in the same manner as in S210 of FIG. 14, target frame data for conversion of pixel coordinates is selected from the target frame data (S305). Next, in the same manner as in S220 of FIG. 14, the position of a pixel of interest i' for coordinate conversion is selected from the target frame data (S310).

Then, the translation quantity u, v is read from RAM, and the location of pixel of interest i' is subjected to coordinate conversion to translate it by −u, y in the x-axis direction and by −v in the y-axis direction, so as to cancel out translational deviation of the target frame (S315). That is, the location of pixel of interest i' of coordinates (ix', iy') is translated to the coordinates (ix'−u, iy'−v). Here, (ix'−u, iy'−v) is an analog quantity, finer than the pixels that make up the frame data.

Next, the rotation quantity δ is read out from RAM, and the location of pixel of interest i' is subjected coordinate conversion to rotate it by −δ about an origin at the center of the frame image, so as to cancel out rotational deviation of the target frame image (S320). Here, where coordinates (ix'−u, iy'−v) are replaced with coordinates (x', y') centered on the origin, and the distance from the origin to coordinates (x', y') is designated r', coordinates (x', y') move by −δ·y' in the x-axis direction and by δ·x' in the y-axis direction with rotation by δ. That is, the position of pixel of interest i', located at coordinates (ix'−u, iy'−v) subsequent to translation, has been shifted to coordinates (x'−δ·y', y'+δ·x'), finer than the pixels that make up the frame data.

Subsequently, a determination is made as to whether coordinate conversion has been performed for each pixel of target frame data (S325). Where there are remaining pixels that have not yet subjected to coordinate conversion, the process of S305-S325 is performed repeatedly while sequentially moving the pixel of note i'; or in the event that the variables have been calculated for all pixels, the routine proceeds to S330.

In S330, a determination is made as to whether coordinate conversion has been performed for all target frame data. If there is any remaining target frame data that has not yet subjected to coordinate conversion, target frame data is selected in the order of the time series and the process of S305-S330 performed repeatedly, terminating the flow in the event that coordinate conversion has bee performed for all target frame data.

By means of the process described above, on the basis of translation quantity data and rotation quantity data, target frame data can be subjected to translation and rotation, to convert the target frame data so as to eliminate rotational deviation among images represented by reference frame data and target frame data.

Coordinate conversion may be performed after multiplying u, v and δ by predetermined correction coefficients depending on the nature of the frame image, etc.; or u, v and δ multiplied by predetermined correction coefficients can be used to perform coordinate conversion for both of two frames of data.

(5-4) Synthesizing Frame Images

When the frame conversion process has been completed, the routine proceeds to S145 of FIG. 11, wherein the synthesis module performs a process to synthesize the reference frame data with target frame data having been subjected to conversion by the frame conversion process described above, to generate image data representing tone of a still image by means of a multitude of pixels.

Figure 16:
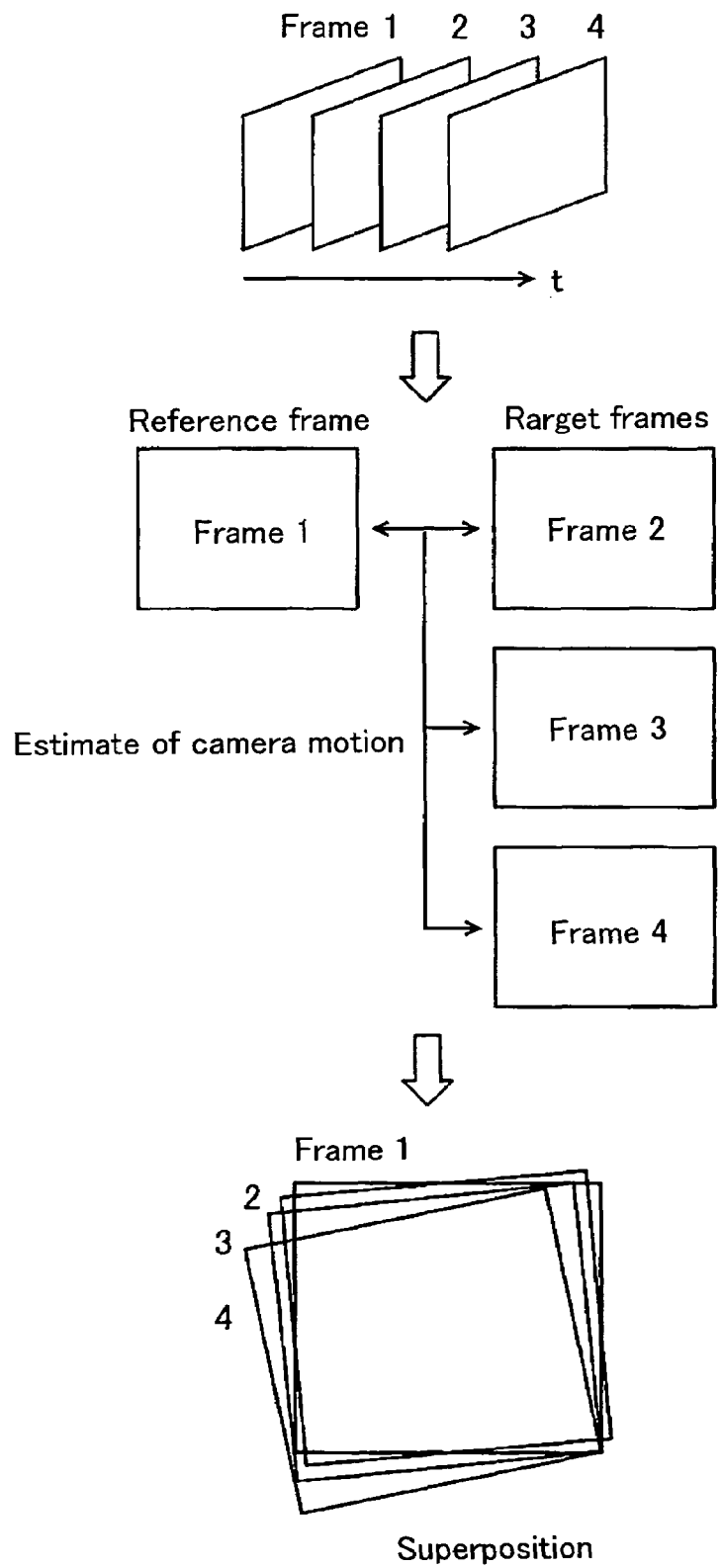
FIG. 16 is a schematic illustration depicting coordinate conversion and superposition of target frame data.

As shown in FIG. 16, by estimating camera motion from a plurality of frames of data, there is performed a process to superpose target frame data having been subjected to coordinate conversion so as to eliminate translational deviation and rotational deviation relative to reference frame data.

Figure 17:
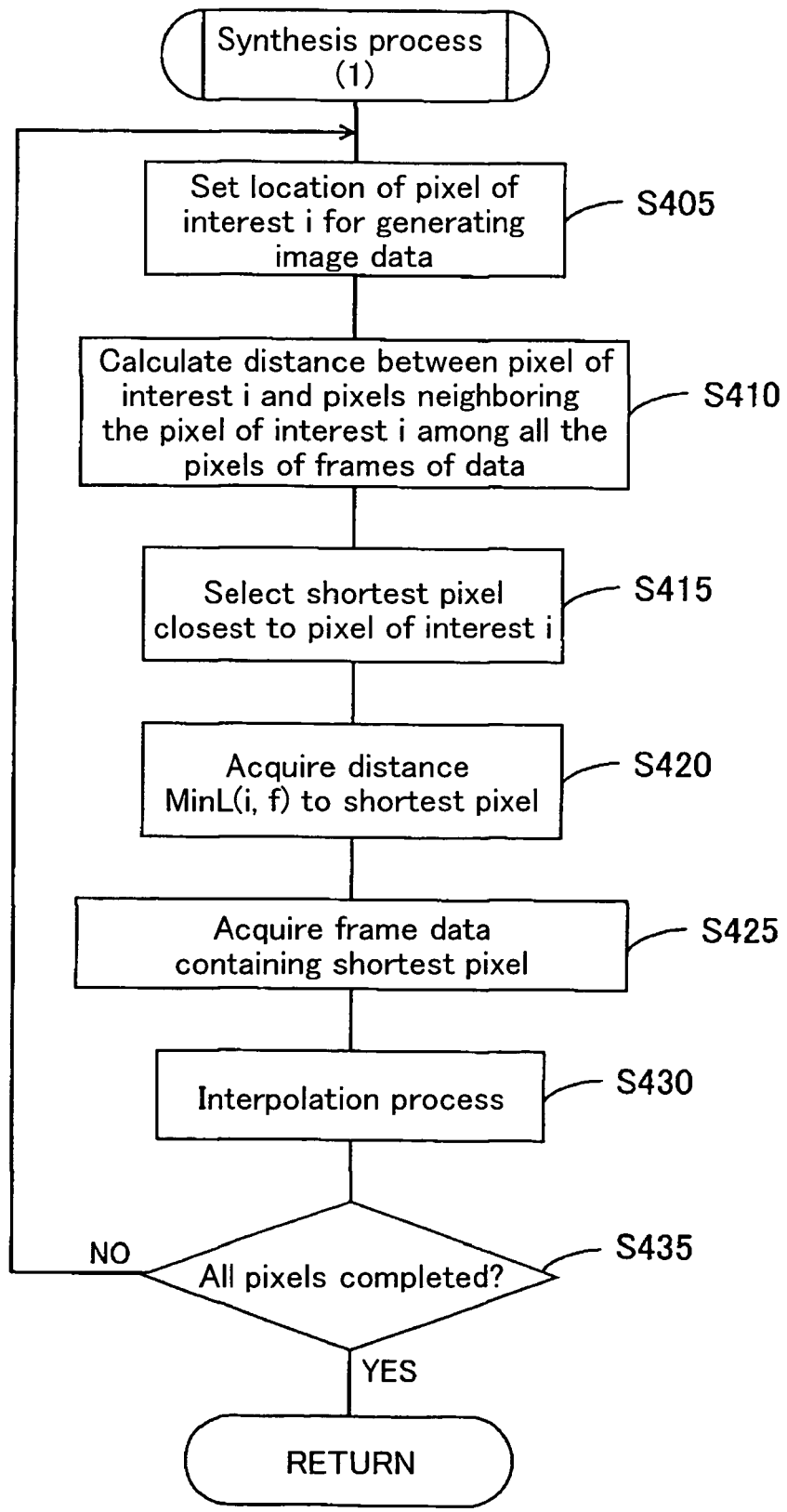
FIG. 17 is a flowchart depicting the synthesis process (1)

FIG. 17 is a flowchart illustrating the synthesis process. Taking as an example a case where frame image pixels are increased by a factor of 1.5 in both the x-axis and y-axis directions, generating of image data representing a still image will be described. This image generating device generates image data by sequentially moving the pixel of interest generating the image data, while performing a predetermined interpolation process using tone data for those pixels, among all pixels of the reference frame data and target frame data, that neighbor the pixel of interest, First, a location for a pixel of interest i generating image data representing tone of a still image is established (S405). In this embodiment, the location for a pixel of interest i corresponding to a still image is established in the same manner as in S220 of FIG. 14; however, here i is different from the pixel of interest i of reference frame data in the camera motion estimation process described above.

When a pixel of interest i has been established, distance from the pixel of interest i to pixels neighboring the pixel of interest i from among all the pixels of all four frames of data is calculated (S410). Next, the shortest pixel that is situated closest to the pixel of interest i is selected (S415). During this selection, the coordinates of this closest pixel are placed in a predetermined area of RAM, for example. Here, where the coordinates of the pixel of interest i based on image data being generated are designated (x0, y0), and the coordinates of a pixel neighboring the pixel of interest i are designated (xf, yf), the pixel that minimizes the expression $\{(xf-x0)^2+(yf-y0)^2\}^{1/2}$ is designated as the shortest pixel.

Figure 18:
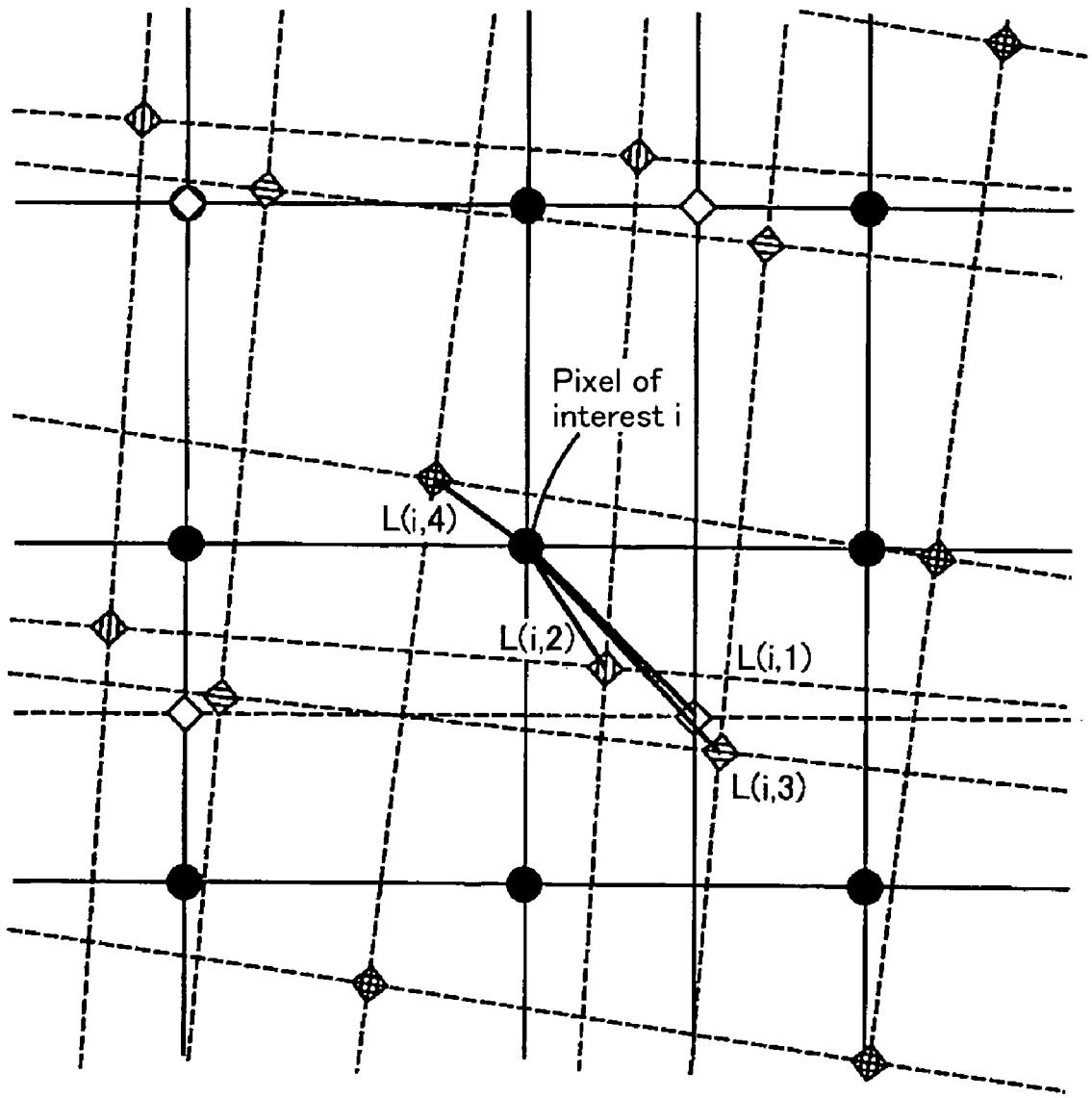
FIG. 18 is a schematic illustration depicting selection of shortest pixel.

FIG. 18 is a schematic illustration depicting selection of the shortest pixel. In the illustrated example, locations of all pixels in the reference frame data and all three target frames of data are plotted, and the locations of pixels in the image data being generated (1.5× horizontal/vertical density) are plotted as well. Here, the frames of data are assigned a frame number f (f=1, 2, 3, 4), and the pixel closest to the pixel of interest is selected from among each frame of data. In the drawing, the distance between the selected pixel and the pixel of interest i is labeled L(i, f). fnearest(i) that minimizes L(i, f) is calculated. The smaller this value is for a pixel (i.e. the closer the selected pixel is to the pixel of interest i), the less the tendency for edge portions in the still image to be jaggy, due to performing an interpolation process that makes reference to the frame of data containing the pixel. For the pixel of interest i shown in the drawing, the minimizing value is L(i, 4), so the pixel in frame 4 is selected.

Subsequently, the distance MinL(i, f) from the) from the pixel of interest i to the shortest pixel is acquired (S425). In the illustrated example, the frame data from frame 4 is acquired. Here, the frame data containing the shortest pixel may be acquired by placing it is a predetermined area of RAM, or acquired by placing the memory address of the frame data containing the shortest pixel in a predetermined pointer in RAM.

Once the frame data containing the shortest pixel has been acquired, using the YCbCr data (tone data) of the shortest pixel from the frame data, a predetermined interpolation process is carried out by bilinear method or the like, generate image data of the pixel of interest i (S430). At this time, the YCbCr data may be used as-is to generate the image data, or the YCbCr data may be converted by means of a predetermined computational equation into RGB data consisting of RGB tone values, to generate image data composed of RGB.

Figure 19:
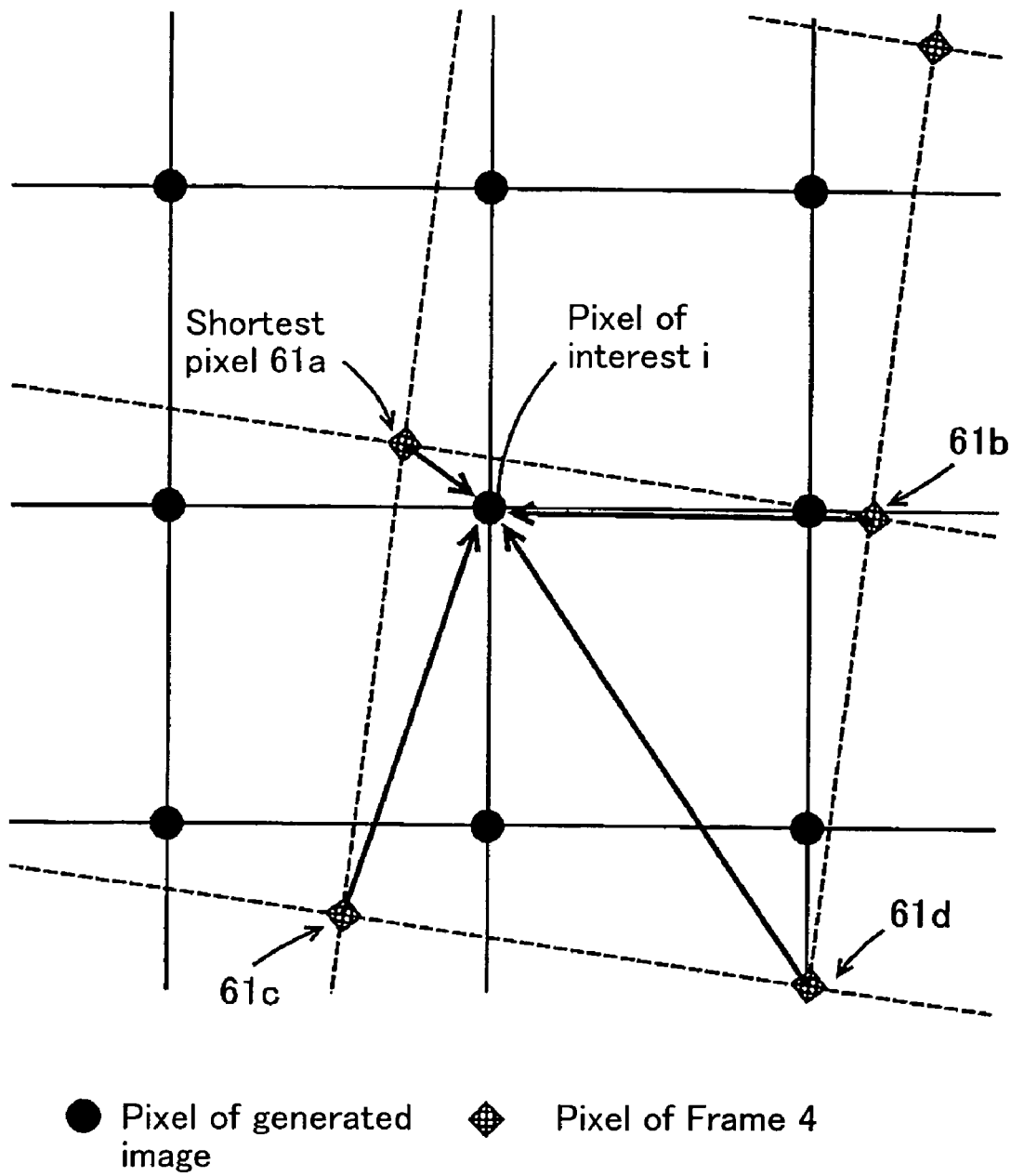
FIG. 19 is a schematic illustration depicting interpolation by a bilinear method.

FIG. 19 is a schematic illustration depicting interpolation by a bilinear (bilinear interpolation) method. As shown in the drawing, an interpolation process is carried out using tone data of the four pixels 61a-d surrounding the pixel of interest i, and containing the shortest pixel 61a from the acquired frame data. The bilinear method involves assigning varying weights to tone data while moving closer from one to the other of the pixels (grid points) 61a-d used in the interpolation calculations, the change being a linear function dependent on tone data of the pixels to either side. Here, an area partitioned by the four pixels 61a=d surrounding the pixel of interest i it is desired to interpolate is divided by pixel of interest i into four partitions, weighting data of opposing angle positions with the area ratio thereof By performing a similar operation for each pixel of image data being generated, all pixel values can be estimated.

In the above manner, positional relationships among images estimated by means of camera motion can be superposed, and tone values (pixel values) of the pixels of the image data being generated can be estimated from the tone data of the pixels of proximate frames of data. That is, since image data of each pixel is generated by interpolation, it is possible to derive a still image of high image quality.

Of course, in order to accelerate the process of generating image data, interpolation could instead be carried out by the nearest neighbor method. In this instance, tone data for the shortest pixel of frame data is designated as image data of the pixel of interest i. Alternatively, interpolation with a high degree of accuracy could be performed by the bicubic method.

Also, input selection of either the "bicubic", "bilinear" or "nearest neighbor" method could be enabled, with the image data of the pixel of interest being generated by means of the selected interpolation process. By so doing, it is possible to select giving precedence to either image quality or to processing speed, thereby improving convenience.

Subsequently, a determination is made as to whether image data has been generated by means of an interpolation process, for all pixels of the image data being generated (S435). In the event that there are some remaining pixels for which image data has not been generated, the process of S405-S435 is repeated while successively moving the pixel of interest i over pixels corresponding to image data being generated. When image data has been generated for all pixels, the flow is terminated.

In this way, a plurality of frames of data having undergone coordinate conversion are synthesized, and image data representing tone of a still image with a multitude of pixels is generated. At this stage, a process to convert YCbCr data to RGB data using a predetermined computational equation, for example, could be performed.

Actual testing has shown that by carrying out the interpolation process using tone data of the pixel closest to a pixel of interest among all pixels of a plurality of frames of data, it is possible to obtain a result in which edge portions of the still image are not jaggy. In this way, a fine, high resolution image of quality not obtainable with a single frame can be generated through the use of a plurality of frames. In particular, motion of each individual frame image can be estimated with good accuracy, to produce a fine, high resolution image.

Once the synthesis process has been completed, the routine proceeds to S150 in FIG. 11 wherein a still image is shown on the display, on the basis of the generated image data.

Figure 20:
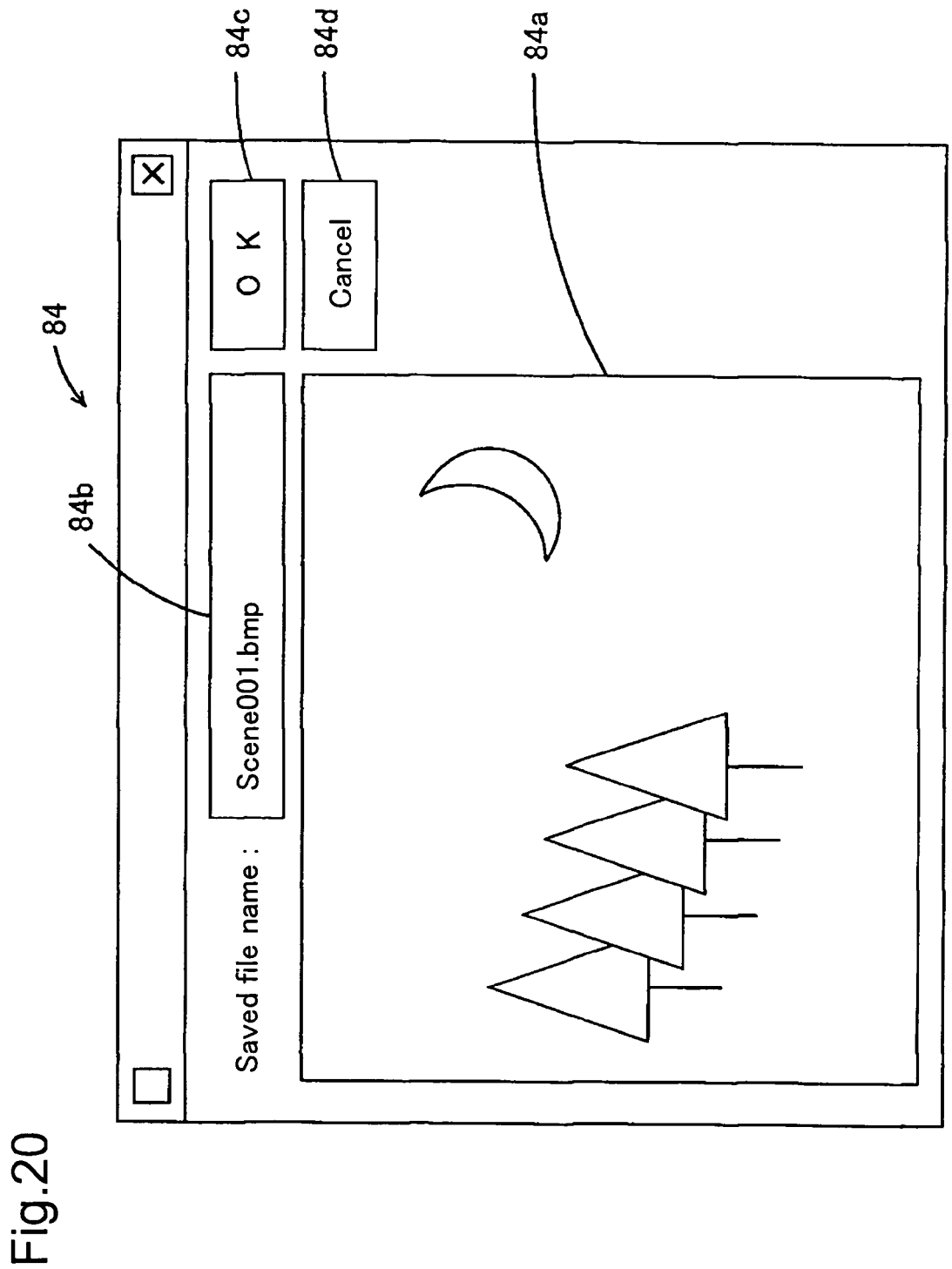
FIG. 20 is an illustration of an exemplary display of a still image save screen.

FIG. 20 shows a dialog box 84 of a still image save screen for displaying the still image and saving the generated image data. In the dialog box 84, the still image is displayed in a still image display field 84a; also displayed are a save file name input field 84b, and buttons 84c, d. When file name input for saving the file has been received by the save file name input field 84b, and the OK button 84c is clicked, the image data is saved on the HD or the like with the file name just entered (S155), and the flow terminates. In this way, the user may acquire, in the form of a fine still image, a desired scene from video. At this time, since [the still image] is generated with the minimum processing time [needed] to obtain the required image quality, the user is not kept waiting for an unnecessarily long period of time.

By means of the above processes, image data representing a still image can be generated through synthesis from a plurality of frames of data, after eliminating translational deviation and rotational deviation among the plurality of frame images represented by the plurality of frames of data, whereby camera shake including a rotational component can be sufficiently corrected, so as to obtain a still image of high image quality from a plurality of frames of data in video data. It is then possible to generate image data by synthesizing a plurality of frames of data appropriate to the image quality of the output image. Further, while it is possible on the one hand to increase the number of frames of data synthesized, in accordance with higher image quality of the data indicated by the image quality setting data, so as to give a still image of high image quality, it is also possible on the other hand to reduce the number of frames of data synthesized, in accordance with faster speed for the data indicated by the image quality setting data, so as to improve the speed at which the still image is generated. Accordingly, it is possible to derive still images by means of an efficient process for generating the image data representing the still images.

In other words, the number of frames of data, for which the relationship between image quality and processing speed is difficult to grasp in sensory terms, need not be set by the user; rather, the number of frames for synthesis are determined in a flexible manner automatically. Items set by the user are "image quality mode" and "resolution", rather than number of frames, making the process intuitive. Where image size and image quality required by a device are determined, video sources of various resolutions can be standardized to given image size and image quality for output.

By eliminating translational deviation of a predetermined center location about which a target frame image is rotated, it is possible to obtain still images of even higher quality. Since the plurality of frames of data synthesized consist of data from a continuous time series with minimal change, by synthesizing these frames of data to generate image data representing a still image, it is possible to obtain a still image of high quality by means of a simple arrangement.

(6) Embodiment 2

In the synthesis process shown in FIG. 17, since the distance MinL(i, f) to the shortest pixel is calculated, the number of frames of data may be determined using this distance.

Figure 21:
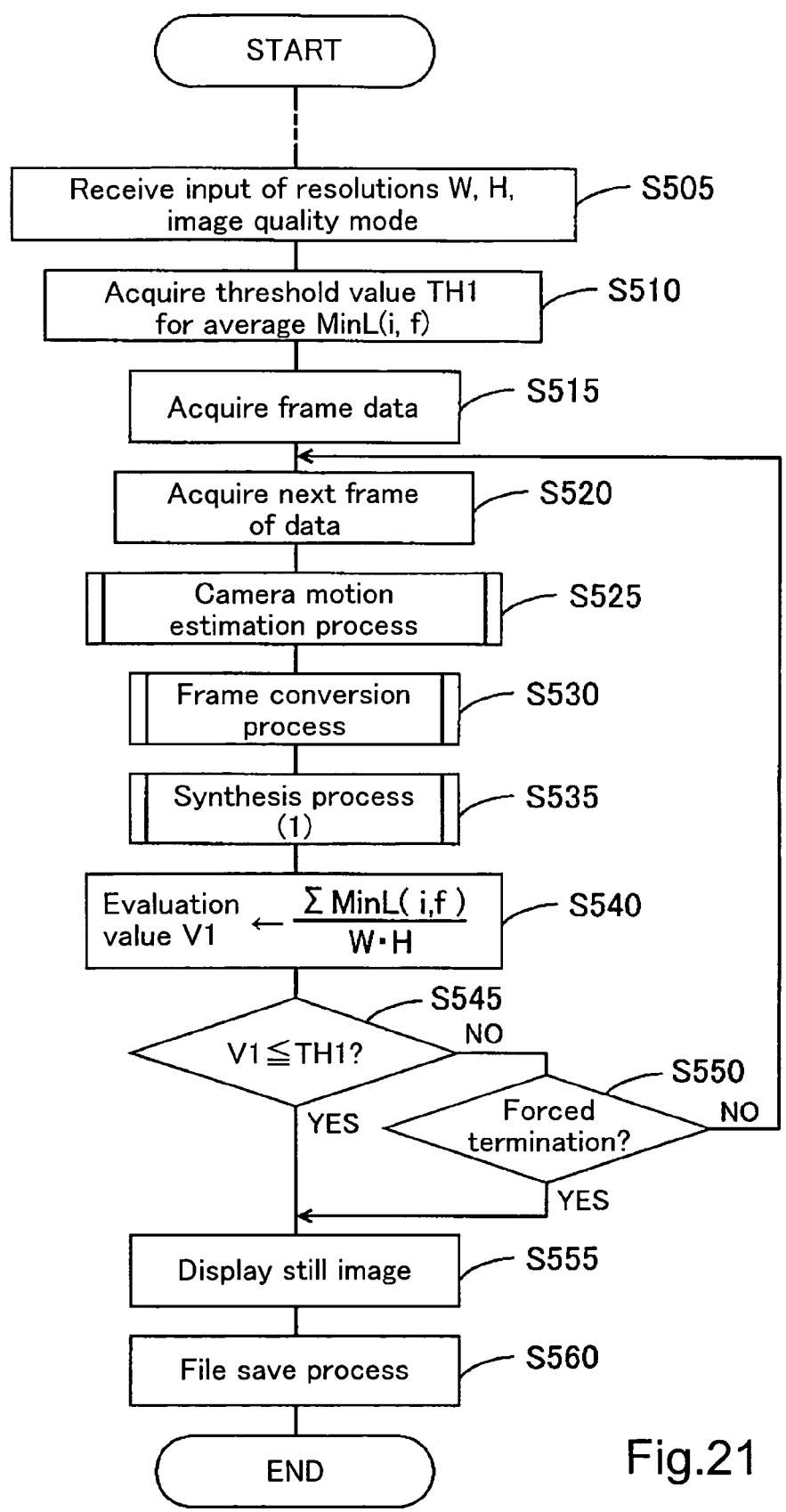
FIG. 21 is a flowchart depicting a process performed by the image generating device pertaining to a second embodiment.

FIG. 21 is a flowchart depicting a process performed by the image generating device pertaining to a second embodiment. In this embodiment, processes S505-520 and S540-S550 are performed by frame acquiring module.

While not shown in the drawing, after input specifying a file name has been received, and a frame image at a certain location where it is desired to generate a still image has been selected, as in S105-S100 of FIG. 11, vertical/horizontal resolution and image quality mode setting inputs are received, and horizontal resolution W, vertical resolution H, and a image quality setting value are acquired (S505). Next, referring the correspondence table shown in FIG. 6, a threshold value TH1 corresponding to the image quality setting value (image quality setting data) is acquired (S510). This TH1 is a threshold value for the average of distance MinL(i, f) to the closest pixel among the pixels of a plurality of frames of dataZ, for each pixel of image data.

Then, reference frame data and target frame data are acquired from the video data (S515). Next, the following frame of data in the time series is acquired as target frame data from the video data (S520). Once the target frame data has been acquired, the camera motion estimation process shown in FIG. 14 is performed, and translation quantity u, v and rotation quantity δ from the target frame data to the target frame data are acquired (S525). Once u, v and δ have been acquired, the frame conversion process shown in FIG. 15 is performed, performing coordinate conversion so as to eliminate deviation from the reference frame data for all pixels of the target frame data (S530). Once the frame conversion process has been performed, the synthesis process (1) shown in FIG. 17 is performed, to calculate MinL(i, f) for each pixel of image data being generated, as well as synthesizing the reference frame data and target frame data to generate image data representing tone of an output image (S535).

Next, an evaluation value V1 for determining whether a predetermined termination condition for terminating acquisition of frame data is calculated (S540). Evaluation value V1 is a value derived as indicated by the following equation, by dividing the sum of MinL(i, f) by the pixel count W·H of the image data generated, i.e., the average value of MinL(i, f).

$$V1=\{\Sigma \mathrm{Min}L(i,f)\}/(W\cdot H) \tag{36}$$

It is then determined whether V1 is equal to or less than TH1 (predetermined termination condition) (S545). Alternatively, it may be determined whether V1 is smaller than TH1. When V1 is greater than (or equal to or greater than) TH1, the termination condition is deemed met and the routine proceeds to S550; if V1 is equal to or less than TH1, it proceeds to S555. In S550, it is determined whether a predetermined forced termination condition has been met (for example, a state in which the forced termination button 83$i$ of FIG. 13 has been clicked), and if the condition is met proceeds to S555, or if the condition is not met, acquires as target frame data the next frame of data in the time series from the video data, and repeats the process of S520-S545. That is, while acquiring successive frames of data from the video data, distance MinL (i, f) to the shortest pixel from the pixel of interest among the plurality of acquired frames of data is calculated for each pixel in the image data being generated, and on the basis of the average value of MinL(i, f) and threshold value TH1, a determination is made as to whether a predetermined termination condition has been met, and when it is determined that the termination condition has been met, acquisition of frame data is terminated. As a result, the process of incrementing frames of data and acquiring frame data is repeated until the average of the distance MinL(i, f) to the shortest pixel is equal to or less than TH1. When, in S545, the termination condition is met, the number of frames of data for acquisition from the video data is determined, and by means of the synthesis process of S535, the determined number of frames of data are synthesized, to create image data representing a still image.

In S555, on the basis of the generated image data, the still image is displayed in the dialog box shown in FIG. 20. The image data is then stored on the HD or the like (S560), and the flow terminates.

By means of the above process, the closer pixels of frame data are to the pixels of the image data being generated, the higher the image quality of the still image; thus, frames of data, in a number of suitable for the image quality desired of a still image for proper output, can be synthesized to create image data, and a still image derived efficiently. Additionally, since at greater image quality mode settings threshold value TH1 is smaller and the number of frames of data is greater, the image quality of the output image can be improved; and since at smaller image quality mode settings the threshold value TH1 is greater and the number of frames of data is smaller, an output image can be obtained rapidly, making the image generating device convenient.

(7) Embodiment 3

Figure 22:
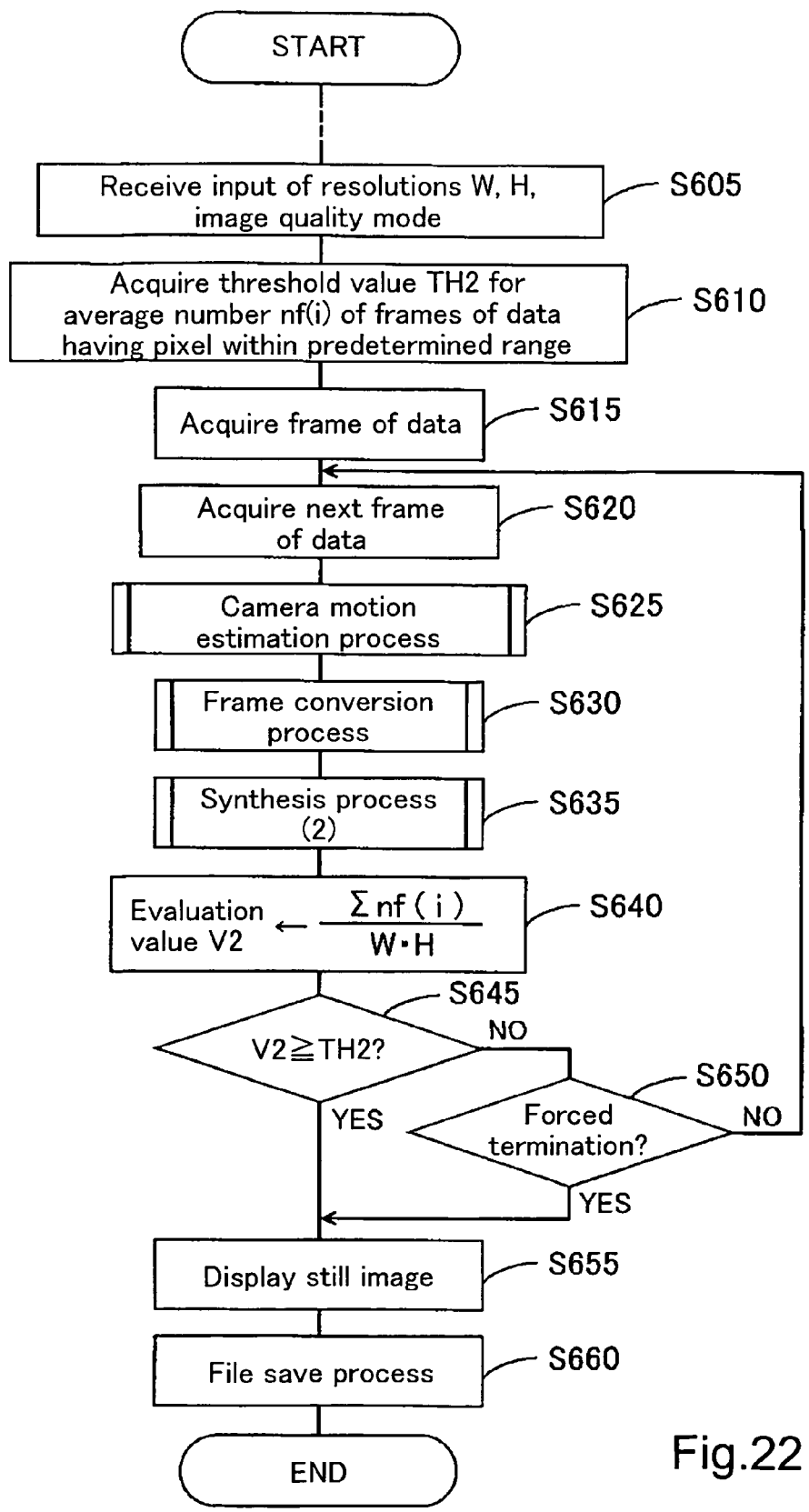
FIG. 22 is a flowchart depicting a process performed by the image generating device pertaining to a third embodiment.
Figure 23:
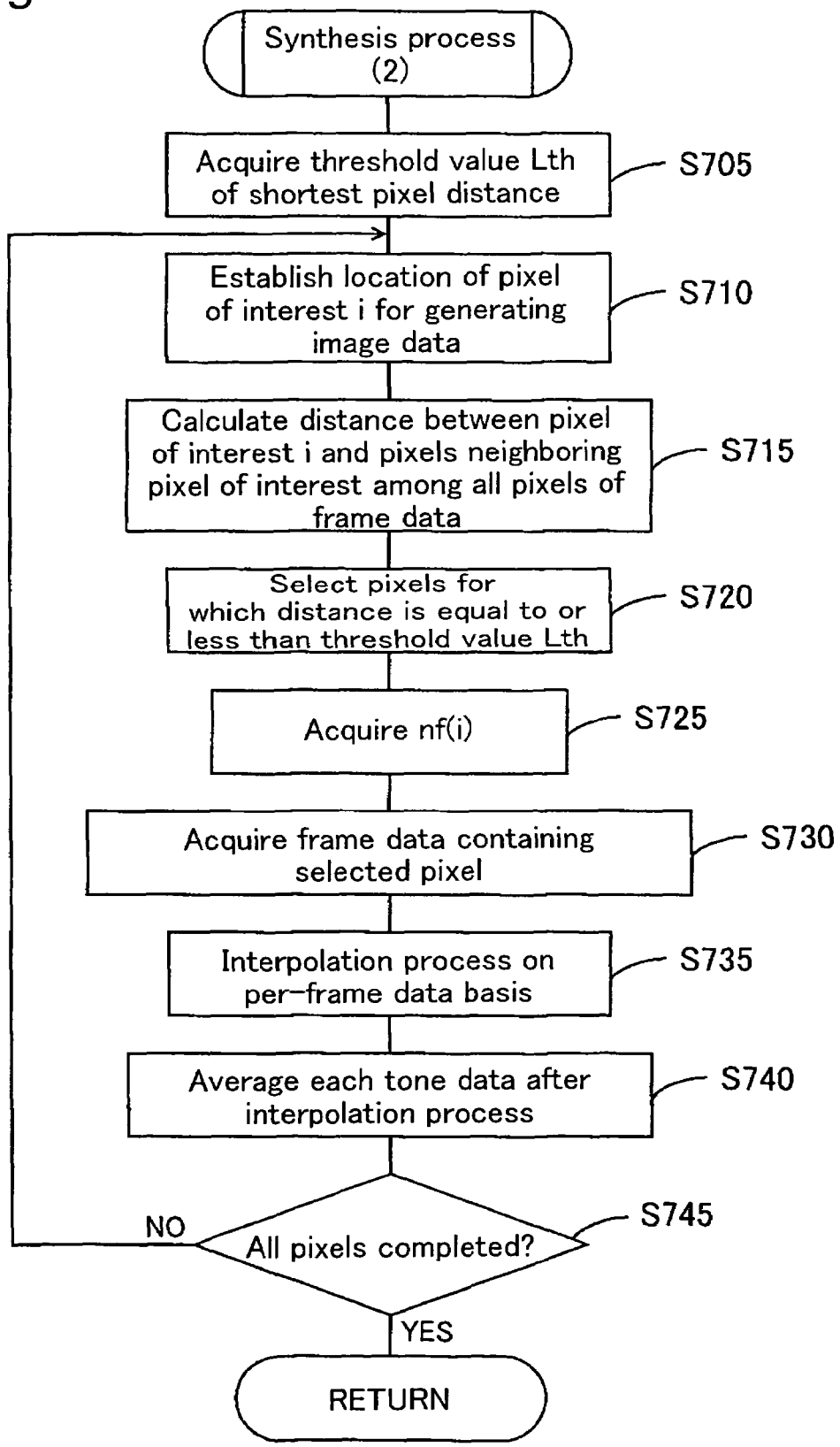
FIG. 23 is a flowchart depicting the synthesis process (2)

FIG. 22 is a flowchart depicting the process performed by the image generating device pertaining to a third embodiment; and FIG. 23 illustrates by means of a flowchart the synthesis process (2) carried out in S635. First, synthesis process (2) will be described.

First, a threshold value Lth for shortest pixel distance is acquired (S705). For example, a print interface screen having a predetermined selection field may be displayed, and a parameter indicating threshold value Lth acquired from input into the selection field, and stored in RAM.

Figure 24:
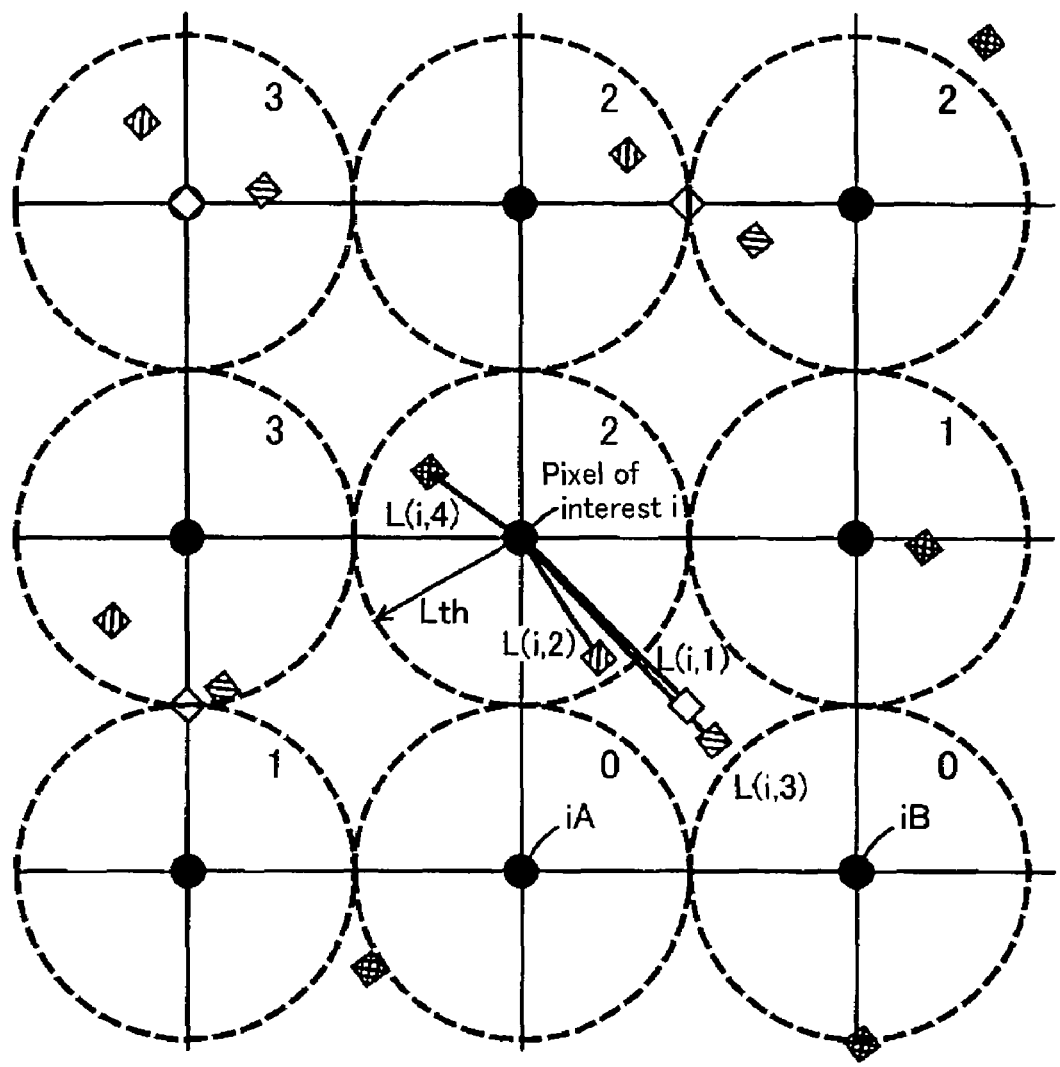
FIG. 24 is a schematic illustration depicting selection of pixels within a predetermined range of a pixel of note i.

Here, as shown in FIG. 24, the threshold value Lth for shortest pixel distance is a threshold value for determining whether a pixel of frame data is within a predetermined distance from a pixel of interest i. In the illustrated example, threshold value Lth is set to ½ the distance between pixels in the image data being generated. The circles represented by dotted lines centered on pixels, including a pixel of interest i, indicate distances of threshold value Lth from the pixels. At upper right within each circle is a digit indicating the number of frames of data within a distance of threshold value Lth from the pixel being generated.

Instead of acquiring through control input a parameter representing threshold value Lth, threshold value Lth could be established automatically, from the pixel count of the image being generated, the frame image total pixel count, or other value. For example, where $Lth$=3×(distance between generated image pixels)× (generated image pixel count)/(frame image total pixel count)

threshold value Lth may be established as a value such that an average of three frame image pixels are within the circles shown in FIG. 24.

Next, in the same manner as in S405-S410 of FIG. 17, a location of a pixel of interest i for generating image data for tone representation of a still image is established (S710), and from among all pixels of all frames of data, distances $\{(xf-x0)^{2}+(yf-y0)^{2}\}^{1/2}$ between pixels at coordinates (xf, yf) neighboring the pixel of interest i, and the pixel of interest i at coordinates (x0, y0) are calculated (S715).

Then, pixels of frame data for which calculated distance is equal to or less than threshold value Lth are selected (S720). During selection, coordinate values for the pixels may be stored in a predetermined area of RAM, for example. In the example of FIG. 24, a pixel of distance L (i, 4) and a pixel of distance L (i, 2) are selected.

In this way, pixels within a predetermined range based on a pixel of interest i can be selected from among a plurality of frames of data.

Thereafter, the number nf(i) of frames of data having pixels that are within the predetermined range of pixel of interest i is calculated and acquired (S725), and the frame data that contains the selected pixels is acquired (S730). In the illustrated example, nf(i)=2. Next, for each individual frame of data, YCbCr data for the shortest pixel from the frame data is used to perform a predetermined interpolation process, such as a bilinear interpolation process or the like, to generate tone data for each individual frame of data (S735). That is, the interpolation process is carried out using frame data that includes pixels within a predetermined range based on a pixel of interest i, from among a plurality of frames of data.

Next, the arithmetic mean of the tone data subsequent to the interpolation process is calculated, and image data of the pixel of interest i is calculated (S740). Here, tone data subsequent to the interpolation process may consist of YCbCr data, or of RGB data. When summarizing tone data, geometric mean, harmonic mean, an average using a different weight for each frame of data, or the like could be employed instead of arithmetic mean. By dispensing with the averaging process when only one pixel of frame data is within the predetermined range from the pixel of interest i, it is possible to speed up the process of generating image data.

As shown by pixel $i_A$ in FIG. 24, when there are no pixels of frame data within a distance equal to or less than threshold value Lth (within the predetermined range) from a pixel of image data being generated, frame data of any of the plurality of frames is used to perform the interpolation process. In this case, the interpolation process may be carried out using reference frame data, or the interpolation process may be carried out by acquiring the frame data that contains the shortest pixel, as shown in FIG. 17. In this way, all pixels of image data being generated can be properly infilled.

Subsequently, a determination is made as to whether image data has been generated by means of the interpolation process, for all pixels of the image data being generated (S745). In the event that there are some remaining pixels for which image data has not been generated, the process of S710-S745 is repeated while successively moving the pixel of interest i, and when image data has been generated for all pixels, the flow is terminated.

By means of the processes described above, a plurality of frames of data having undergone coordinate conversion are synthesized to generate image data for tone representation of a still image with a multitude of pixels. In particular, since it is possible prevent deviation among frame images, from standing out when estimates of movement of individual frame images have poor accuracy, it becomes possible to derive fine, high-resolution images in such cases.

The flow of FIG. 22 is now described, on the assumption that the synthesis process described above is performed.

First, once control input specifying a video file has been received and input selecting a frame image at a location where it is desired to create a still image has been received, the horizontal pixel count W, vertical pixel count H, and image quality mode setting are acquired (S605). Next, referring to the correspondence table shown in FIG. 6, a threshold value TH2 (image quality setting data) corresponding to the image quality mode setting is acquired (S610). This TH2 value is a threshold value for the average number of frames of data having pixels within a predetermined range, for each pixel of image data.

Then, a frame of data is acquired as reference frame data from the video data (S615), and the following frame of data in the time series is acquired as target frame data (S620). When target frame data is acquired, the camera motion estimation process shown in FIG. 14 is performed, and translation quantity u, v and rotation quantity δ from the target frame data to the target frame data are acquired (S625). Once u, v and δ have been acquired, the frame conversion process shown in FIG. 15 is performed, performing coordinate conversion so as to eliminate deviation from the reference frame data, for all pixels of the target frame data (S630). Once the frame conversion process has been performed, the synthesis process (2) shown in FIG. 23 is performed, to calculate nf(i, f) for each pixel of image data being generated, as well as synthesizing the reference frame data and target frame data to generate image data representing tone of an output image (S635).

Next, an evaluation value V2 for determining whether a predetermined termination condition for terminating acquisition of frame data is calculated (S640). Evaluation value V2 is a value derived as indicated by the following equation, by dividing the sum of nf(i, f) by the pixel count W·H of the image data generated, i.e., the average value of nf(i, f).

$$V2=\{\Sigma nf(i)\}/(W \cdot H) \quad (37)$$

It is then determined whether V2 is equal to or greater than TH2 (a predetermined termination condition) (S645). When V2 is less than (or equal to or less than) TH2, the termination condition is deemed met and the routine proceeds to S650; if V2 is equal to or greater than TH2, it proceeds to S655. In S650, it is determined whether a predetermined forced termination condition has been met, and if the condition is met proceeds to S655, or if the condition is not met, acquires as target frame data the next frame of data in the time series from the video data, and repeats the process of S620-S645. That is, while acquiring successive frames of data from the video data, the number nf(i) of frames having pixels within a predetermined range is calculated for each pixel in the image data being generated, and on the basis of the average value of nf(i) and threshold value TH2, a determination is made as to whether a predetermined termination condition has been met, and when it is determined that the termination condition has been met, acquisition of frame data is terminated. As a result, the process of incrementing frames of data and acquiring frame data is repeated until the average of the number nf(i) of frames having pixels within a predetermined range is equal to or greater than TH2. When, in S645, the termination condition is met, the number of frames of data for acquisition from the video data is determined, and by means of the synthesis process of S635, the determined number of frames of data are synthesized, to create image data representing a still image.

In S655, a still image is displayed on the basis of the generated image data. The image data is then stored on the HD or the like (S660), and the flow terminates.

By means of the above process, the closer pixels of frame data are to the pixels of the image data being generated, the higher the image quality of the still image; thus, frames of data, in a number of suitable for the image quality desired of a still image for proper output, can be synthesized to create image data, and a still image derived efficiently. Additionally, since at greater image quality mode settings the threshold value TH2 is greater and the number of frames of data is larger, the image quality of the output image can be improved; and since at smaller image quality mode settings, the threshold value TH2 is smaller and the number of frames of data is smaller, an output image can be obtained rapidly, making the image generating device convenient.

(8) Embodiment 4

Figure 25:
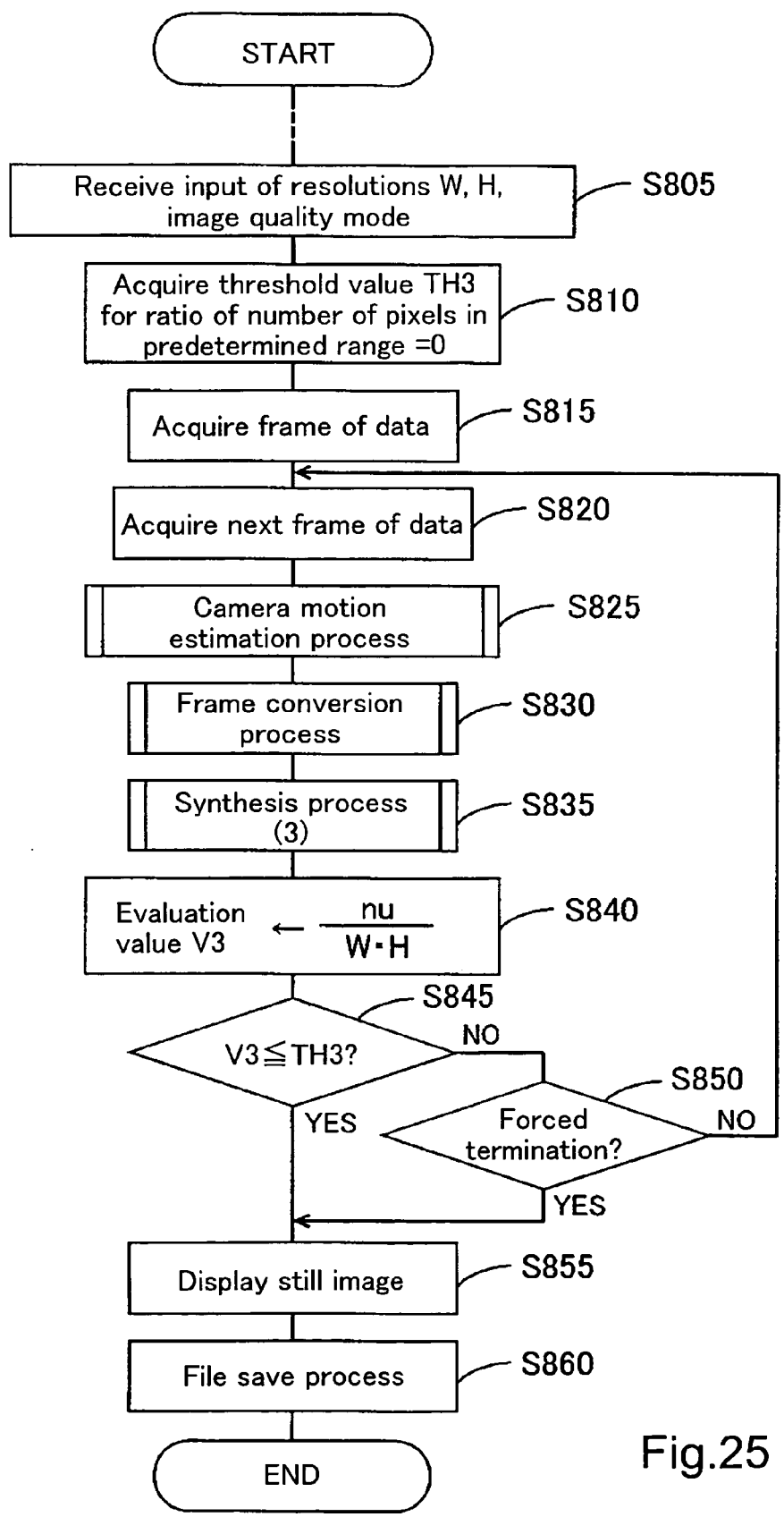
FIG. 25 is a flowchart depicting a process performed by the image generating device pertaining to a fourth embodiment.
Figure 26:
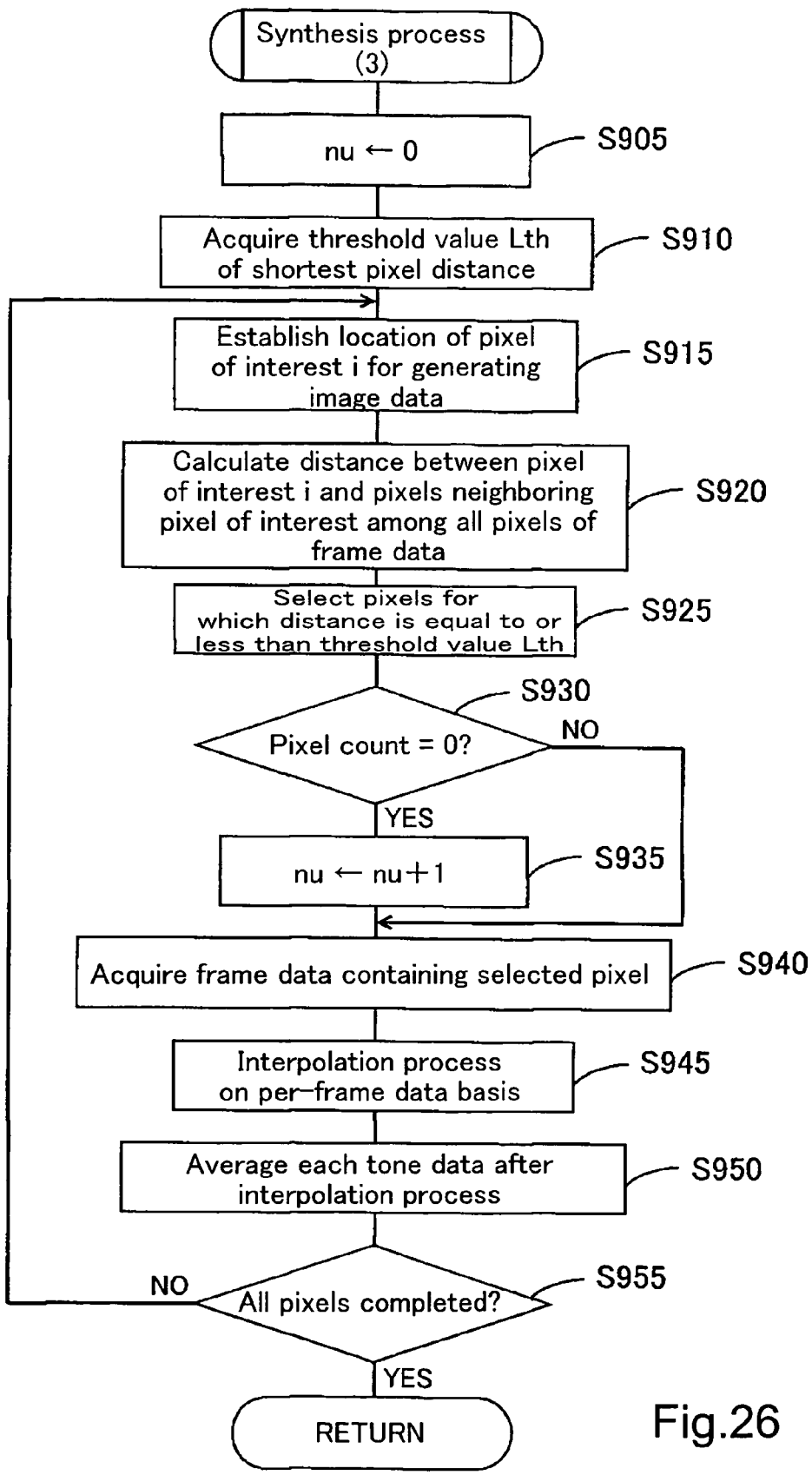
FIG. 26 is a flowchart depicting the synthesis process (3)

FIG. 25 is a flowchart depicting the process performed by the image generating device pertaining to a fourth embodiment; and FIG. 26 illustrates by means of a flowchart the synthesis process (3) carried out in S835. First, synthesis process (3) will be described.

First, a "0" is placed in a counter nu provided in RAM (S905). Next, in the same manner as in S505-S520 of FIG. 23, threshold value Lth for shortest pixel distance is acquired; a location of a pixel of interest i for generating image data for tone representation of a still image is established, from among all pixels of all frames of data; distances $\{(xf-x0)^2+(yf-y0)^2\}^{1/2}$ between pixels at coordinates (xf, yf) neighboring the pixel of interest i, and the pixel of interest i at coordinates (x0, y0) are calculated; and pixels of frames of data for which calculated distance is equal to or less than the threshold value Lth are selected (S910-S925).

Next, a determination is made as to whether the number of pixels of frame data within a predetermined range from the pixel of interest i is 0 (whether or not it is 0 or less) (S930). When the condition is met, the counter is incremented by 1 (S935) and the routine proceeds to S940; when the condition is not met, it proceeds directly to S940. In the example of FIG. 24, two pixels, i.e., pixels $i_A$ and $i_B$, of the nine pixels of image data being generated do not have pixels present within the predetermined range. Accordingly, nu is incremented by 1 when the pixel of interest is pixels $i_A$ or $i_B$.

In S940-S950, as in S730-S740 described previously, frame data containing selected pixels is acquired; for each individual frame of data, YCbCr data for the shortest pixel from the frame data is used to perform a predetermined interpolation process, such as a bilinear interpolation process or the like, to generate tone data for each individual frame of data; the arithmetic mean of tone data subsequent to the interpolation process is calculated; and image data of the pixel of interest i is generated.

Subsequently, a determination is made as to whether image data has been generated by means of an interpolation process, for all pixels of the image data being generated (S955). In the event that there are some remaining pixels for which image data has not been generated, the process of S915-S955 is repeated while successively moving the pixel of interest i, and when image data has been generated for all pixels, the flow is terminated.

The flow of FIG. 25 is now described, on the assumption that the synthesis process described above is performed.

First, once control input specifying a video file has been received and input selecting a frame image at a location where it is desired to create a still image has been received, the horizontal pixel count W, vertical pixel count H, and image quality mode setting are acquired (S805). Next, referring to the correspondence table shown in FIG. 6, a threshold value TH3 (image quality setting data) corresponding to the image quality mode setting is acquired (S810). This TH3 value is a threshold value for the ratio of the number of pixels among pixels of image data for which the number of frame data pixels within a predetermined range is 0, to the total number of pixels in the image data.

Then, a frame of data is acquired as reference frame data from the video data (S815), and the following frame of data in the time series is acquired as target frame data (S820). When target frame data is acquired, the camera motion estimation process shown in FIG. 14 is performed, and translation quantity u, v and rotation quantity δ from the target frame data to the target frame data are acquired (S 825). Once u, v and δ have been acquired, the frame conversion process shown in FIG. 15 is performed, performing coordinate conversion so as to eliminate deviation from the reference frame data, for all pixels of the target frame data (S830). Once the frame conversion process has been performed, the synthesis process (3) shown in FIG. 23 is performed to calculate nu, as well as synthesizing the reference frame data and target frame data to generate image data representing tone of an output image (S835).

Next, an evaluation value V3 for determining whether a predetermined termination condition for terminating acquisition of frame data is calculated (S840). Evaluation value V3 is a value derived as indicated by the following equation, by dividing nu by the pixel count W·H of the image data generated, i.e., the proportion of pixels among all generated pixels, for which the pixel is not in a predetermined range.

$$V3 = nu/(W \cdot H) \tag{38}$$

It is then determined whether V3 is equal to or less than TH3 (a predetermined termination condition) (S845). When V3 is greater than (or equal to or greater than) TH3, the termination condition is deemed met and the routine proceeds to S850; if V3 is equal to or less than TH3, it proceeds to S855. In S850, it is determined whether a predetermined forced termination condition has been met, and if the condition is met proceeds to S855, or if the condition is not met, acquires as target frame data the next frame of data in the time series from the video data, and repeats the process of S820-S845. That is, while acquiring successive frames of data from the video data, the number nu of pixels on which the number of frame data pixels within a predetermined range is 0 for pixels in the image data being calculated, and on the basis of nu and threshold value TH3, a determination is made as to whether a predetermined termination condition has been met, and when it is determined that the termination condition has been met, acquisition of frame data is terminated. As a result, the process of incrementing frames of data and acquiring frame data is repeated until the ratio of the number nu of pixels, among pixels in the image data being generated, on which no pixels within the predetermined range are present is equal to or less than TH3. When, in S845, the termination condition is met, the number of frames of data for acquisition from the video data is determined, and by means of the synthesis process of S835, the determined number of frames of data are synthesized, to create image data representing a still image.

Figure 27:
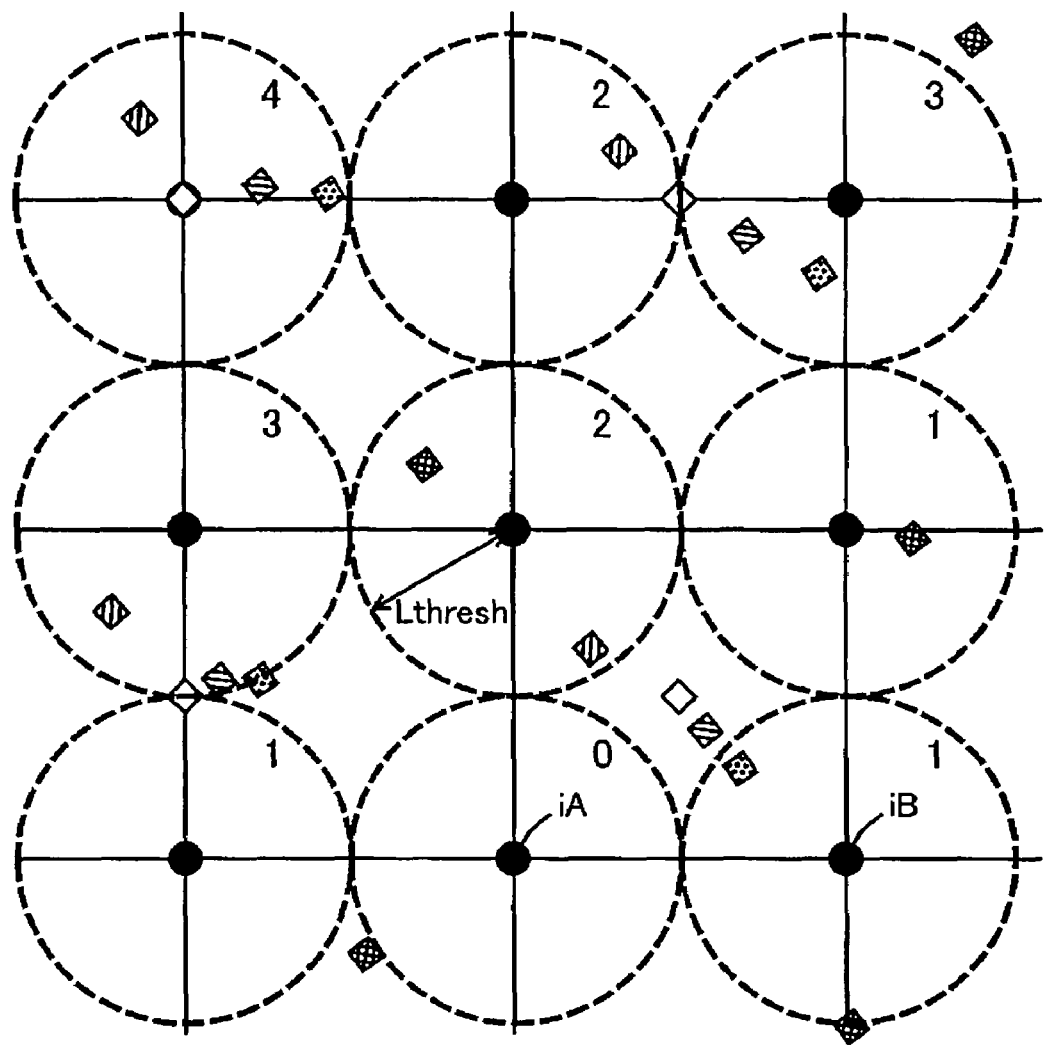
FIG. 27 is a schematic illustration depicting the state of FIG. 24, with one additional frame.

In the example of FIG. 24, two pixels among the nine pixels of image data being generated have a pixel count of 0 in the predetermined range, and thus the evaluation value V3 is designated as $2/9 = 0.22$. In the example of FIG. 6, where the image quality mode setting is 3, the threshold value TH3 will be 0.2, and the condition will not be met in S845. Thus, in S820-S840, another target frame of data is added and the frame conversion process is performed. One additional target frame of data (Frame 5) is added to the four frames of data depicted in FIG. 24, producing the state shown in FIG. 27 once the frame conversion process has been performed. At this time, since no pixel within the predetermined range is present in only one pixel, namely pixel $i_4$, among the nine pixels of image data being generated, the evaluation value V3 is $1/9 = 0.11$. Thus, since V3≦TH3, the termination condition is met, the condition is met in S845.

In S855, a still image is displayed on the basis of the generated image data. The image data is then stored on the HD or the like (S860), and the flow terminates.

By means of the above process, the closer pixels of frame data are to the pixels of the image data being generated, the higher the image quality of the still image; thus, frames of data, in a number of suitable for the image quality desired of a still image for proper output, can be synthesized to create image data, and a still image derived efficiently.

For reasons such as a series of images having exactly identical content, it is conceivable that a standard cannot be arrived at, regardless of how many additional frames of data are added. Means for stopping the process may be provided to the loop that adds frames of data, in order avoid an endless loop in the event that a standard cannot be arrived at. For example, it would be possible to simply establish an upper limit for the number of frames of data synthesized, or to terminate the process in the event that the evaluation value is substantially unchanged for a specified number of successive iterations, in order to avoid an endless loop.

Incidentally, in S930 of FIG. 26, it would be possible also to determine whether the number of frames of data within a predetermined range from a pixel of interest i is equal to or less than a predetermined number (e.g. 1), and where equal to or less than the predetermined number, to increment nu by one. In this case as well, the ratio of nu to the total pixel count of the image data being generated is an index of how close pixels of frame data are from pixels of generated image data, so a smaller value for threshold value TH3 (a greater image quality mode setting) increases image quality of the still image, whereas a larger value for threshold value TH3 enables image data to be generated faster, making the image generating device convenient.

Up to this point, there have been described working examples incorporating a number of different kinds of image quality setting data; however, the method employing image quality setting data (1) is the simplest method, since it involves simply deciding upon a number of frames prior to frame acquisition. In comparison, the methods employing image quality setting data (2~4) involve acquiring data by a predetermined method for each pixel of image data, and then summarizing the data for all pixels, which represents a greater processing load. Where a large number of frames are being synthesized, or where deviation among frames of data is random, the respective methods may give substantially identical results through adjustment to proper settings or threshold values. However, in the case of synthesizing about four frames, with bias being present in deviation among the frames of data, the method employing image quality setting data (1) may not provide the desired level of image quality in all locations, making methods employing image quality setting data (2-4) more effective in such cases. By using image quality setting data appropriate to the synthesis module, as in the working example described hereinabove, it is possible to reduce the processing load.

(9) Conclusion

Various arrangements for the image generating device of the present invention are possible.

For example, the printer may be integrated with the computer. The flows described hereinabove may be executed within the body of the computer, or some or all of them executed by a printer or dedicated image output device.

The large number of pixels making up image data may be arranged in a dot matrix in regular vertical and horizontal rows, or in any of various other conceivable arrangements. For example, image data composed of pixels arranged regularly in honeycomb configuration so as to line up in a dense regular hexagon is also possible.

The invention may also be reduced to practice by synthesizing portions of frame images to generate image data representing a still image. Even with an interlaced video image, in which each line has an unknown area, superimposing on a field by field basis, is effective even for I·P conversion; and where a single scene of motion video is to be displayed or printed as a high resolution still image, detail can be enhanced. Of course, it is effective also when superimposing a plurality of frames, without the intent of converting resolution (e.g. when synthesizing a panorama, etc.)

When detecting translation quantity or rotation quantity of frame images, detection may be carried out while varying the reference frame data. Where first, second, and third frames of data are acquired in order from a time series, it is often the case the deviation between images represented by the second and third frames of data, which are adjacent to one another in the time series, is less than rotational deviation between images represented by the first and third frames of data, so translation quantity representing translational deviation or rotation quantity indicating rotational deviation can be detected with a higher degree of accuracy. Therefore, translation data representing translational deviation or rotation data representing rotational deviation can be acquired with a high degree of accuracy and a still image of higher image quality can be obtained.

As was described above, the present invention can provide, in various aspects, an image generating device and image generating program which make it possible to efficiently execute the process of generating image data representing the still image, so as to efficiently produce the still image. Furthermore, the present invention can also be applied as an image generating method.

What is claimed is:

1. An image generating method for acquiring a plurality of frames of data from video data having a multitude of frames of data, the data representing tones of an image by means of a multitude of pixels, and synthesizing the plurality of frames of data to generate image data for representing by means of multitude of pixels the tones of an output image for an image output device, the method comprising the steps of:

(a) determining, on a basis of a total number of pixels in frame data and image quality setting data that can set image quality of the output image, a number of frames of data for acquisition from the video data, and acquiring the determined number of frames of data from the video data; and (b) synthesizing the acquired number of frames of data and generating the image data, wherein the image quality setting data is a coefficient multiplied by a ratio of the total number of pixels in the frame data to a total number of pixels in the image data, and the step (a) calculates the value of the coefficient multiplied by the ratio, determines the number of frames of data for acquisition generally coinciding with the value, and acquires the determined number of the frames of data from the video data.

2. An image generating method for acquiring a plurality of frames of data from video data having a multitude of frames of data, the data representing tones of an image by means of a multitude of pixels, and synthesizing the plurality of frames of data to generate image data for representing by means of multitude of pixels the tones of an output image for an image output device, the method comprising the steps of:

(a) determining, on a basis of a total number of pixels in frame data and image quality setting data that can set image quality of the output image, a number of frames of data for acquisition from the video data, and acquiring the determined number of frames of data from the video data;

(b) synthesizing the acquired number of frames of data and generating the image data;

(c) acquiring, on a basis of the plurality of frames of data, deviation data representing deviation among images represented by the plurality of frames of data; and (d) performing a conversion process wherein, on a basis of the acquired deviation data, at least one of the respective images represented by the plurality of frames of data is moved to convert at least one of the plurality of frames of data in order to reduce deviation among images, wherein the step (b) synthesizes the plurality of frames of data subjected to the conversion process and generates the image data, and wherein the image quality setting data is a coefficient multiplied by the ratio of the total number of pixels in the frame data to a total number of pixels in the image data, and the step (a) calculates the value of the coefficient multiplied by the ratio, determines the number of frames of data for acquisition generally coinciding with the value, and acquires the determined number of the frames of data from the video data.

* * * * *